US010210594B2

(12) United States Patent
John

(10) Patent No.: US 10,210,594 B2
(45) Date of Patent: *Feb. 19, 2019

(54) DEEP LEARNING VIA DYNAMIC ROOT SOLVERS

(71) Applicant: International Business Machines Corporation, Armonk, NY (US)

(72) Inventor: Anto Ajay Raj John, Trichy (IN)

(73) Assignee: International Business Machines Corporation, Armonk, NY (US)

( * ) Notice: Subject to any disclaimer, the term of this patent is extended or adjusted under 35 U.S.C. 154(b) by 30 days.

This patent is subject to a terminal disclaimer.

(21) Appl. No.: 15/448,637

(22) Filed: Mar. 3, 2017

(65) Prior Publication Data

US 2018/0253816 A1 Sep. 6, 2018

(51) Int. Cl.
*G06F 9/50* (2006.01)
*G06T 1/20* (2006.01)
*G06N 99/00* (2010.01)

(52) U.S. Cl.
CPC .................. *G06T 1/20* (2013.01); *G06F 9/50* (2013.01); *G06N 99/005* (2013.01)

(58) Field of Classification Search
CPC ........ G06T 1/20; G06T 2210/52; G09G 5/363
See application file for complete search history.

(56) References Cited

U.S. PATENT DOCUMENTS

| 6,751,640 | B1 | 6/2004 | Acharya |
| 2006/0114903 | A1 | 6/2006 | Duffy, IV et al. |
| 2013/0328890 | A1 | 12/2013 | Avkarogullari et al. |
| 2014/0104450 | A1 | 4/2014 | Cox |
| 2015/0042644 | A1 | 2/2015 | Jeong et al. |
| 2016/0321776 | A1 | 11/2016 | Zou et al. |
| 2016/0321777 | A1 | 11/2016 | Jin et al. |
| 2016/0342887 | A1 | 11/2016 | Tieleman et al. |
| 2017/0024849 | A1 | 1/2017 | Liu et al. |

(Continued)

FOREIGN PATENT DOCUMENTS

CN         105227669 A        1/2016

OTHER PUBLICATIONS

Anto Ajay Raj John, "Deep Learning via Dynamic Root Solvers," U.S. Appl. No. 15/857,765, filed Dec. 29, 2017.

(Continued)

*Primary Examiner* — Phi Hoang
(74) *Attorney, Agent, or Firm* — Jared C. Chaney

(57) ABSTRACT

The present invention provides a computer implemented method, system, and computer program product of deep learning via dynamic root solvers. In an embodiment, the present invention includes (1) forming an initial set of GPUs into an initial binary tree architecture, where the initial set includes initially idle GPUs and an initial root solver GPU as the root of the initial binary tree architecture, (2) calculating initial gradients and initial adjusted weight data, (3) choosing a first currently idle GPU as a current root solver GPU, (4) forming a current set of GPUs into a current binary tree architecture, where the current set includes the additional currently idle GPUs and the current root solver GPU as the root of the current binary tree architecture, (5) calculating current gradients and current adjusted weight data, and (6) transmitting an initial update to the weight data to the available GPUs.

8 Claims, 9 Drawing Sheets

(56) References Cited

U.S. PATENT DOCUMENTS

2017/0285708 A1  10/2017  Cooper et al.

OTHER PUBLICATIONS

List of IBM Patents or Patent Applications Treated as Related, Dated Dec. 28, 2017, 2 pages.
"Accelerated Examination Support Document," International Business Machines Corporation, Dated Feb. 26, 2018, 26 pages.
Anto Ajay Raj John, "Deep Learning via Dynamic Root Solvers," U.S. Appl. No. 15/906,044, filed Feb. 27, 2018.
List of IBM Patents or Patent Applications Treated as Related, Dated Feb. 26, 2018, 2 pages.
Krizhevsky, "ImageNet Classification with Deep Convolutional Neural Networks," NIPS Proceedings, Advances in Neural Information Processing Systems 25 (NIPS 2012), 9 pages https://papers.nips.cc/paper/4824-imagenet-classification-with-deep-convolutional-neural-networks.

DEEP LEARNING VIA DYNAMIC ROOT SOLVERS

BACKGROUND

The present disclosure relates to deep learning, and more specifically, to deep learning via dynamic root solvers.

SUMMARY

The present invention provides a computer implemented method, a system, and a computer program product of deep learning via dynamic root solvers. In an exemplary embodiment, the computer implemented method, the system, and the computer program product include (1) identifying, by a host computer processor, graphic processor units (GPUs) that are available (available GPUs), (2) identifying, by the host computer processor, GPUs that are idle (initially idle GPUs) among the available GPUs for an initial iteration of deep learning, (3) choosing, by the host computer processor, one of the initially idle GPUs as an initial root solver GPU for the initial iteration, (4) initializing, by the host computer processor, weight data for an initial set of multidimensional data, (5) transmitting, by the host computer processor, the initial set of multidimensional data to the available GPUs, (6) forming, by the host computer processor, an initial set of GPUs into an initial binary tree architecture, where the initial set includes the initially idle GPUs and the initial root solver GPU, where the initial root solver GPU is the root of the initial binary tree architecture, (7) calculating, by the initial set of GPUs, initial gradients and a set of initial adjusted weight data with respect to the weight data and the initial set of multidimensional data via the initial binary tree architecture, (8) in response to the calculating the initial gradients and the initial adjusted weight data, identifying, by the host computer processor, a first GPU among the available GPUs to become idle (first currently idle GPU) for a current iteration of deep learning, (9) choosing, by the host computer processor, the first currently idle GPU as a current root solver GPU for the current iteration, (10) transmitting, by the host computer processor, a current set of multidimensional data to the current root solver GPU, (11) in response to the identifying the first currently idle GPU, identifying, by the host computer processor, additional GPUs that are currently idle (additional currently idle GPUs) among the available GPUs, (12) transmitting, by the host computer processor, the current set of multidimensional data to the additional currently idle GPUs, (13) forming, by the host computer processor, a current set of GPUs into a current binary tree architecture, where the current set includes the additional currently idle GPUs and the current root solver GPU, where the current root solver GPU is the root of the current binary tree architecture, (14) calculating, by the current set of GPUs, current gradients and a set of current adjusted weight data with respect to at least the weight data and the current set of multidimensional data via the current binary tree architecture, (15) in response to the initial root solver GPU receiving a set of calculated initial adjusted weight data, transmitting, by the initial root solver GPU, an initial update to the weight data to the available GPUs, (16) in response to the current root solver GPU receiving a set of current initial adjusted weight data, transmitting, by the current root solver GPU, a current update to the weight data to the available GPUs, and (17) repeating the identifying, the choosing, the transmitting, the forming, and the calculating with respect to the weight data, updates to the weight data, and subsequent sets of multidimensional data.

DETAILED DESCRIPTION

Figure 1A:
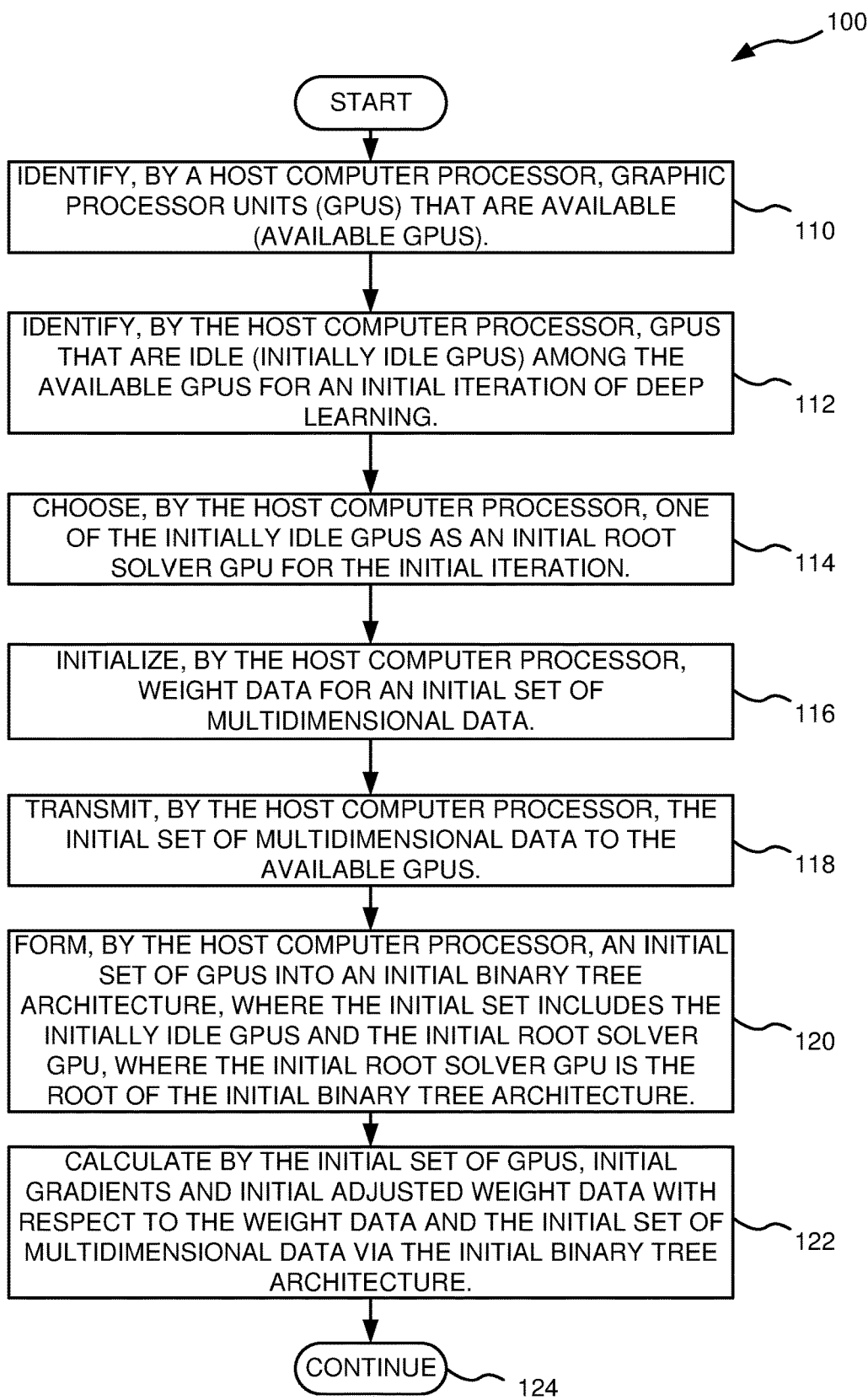
FIG. 1A depicts a flowchart in accordance with an exemplary embodiment of the present invention.

The present invention provides a computer implemented method, a system, and a computer program product of deep learning via dynamic root solvers. In an exemplary embodiment, the computer implemented method, the system, and the computer program product include (1) identifying, by a host computer processor, graphic processor units (GPUs) that are available (available GPUs), (2) identifying, by the host computer processor, GPUs that are idle (initially idle GPUs) among the available GPUs for an initial iteration of deep learning, (3) choosing, by the host computer processor, one of the initially idle GPUs as an initial root solver GPU for the initial iteration, (4) initializing, by the host computer processor, weight data for an initial set of multidimensional data, (5) transmitting, by the host computer processor, the initial set of multidimensional data to the available GPUs, (6) forming, by the host computer processor, an initial set of GPUs into an initial binary tree architecture, where the initial set includes the initially idle GPUs and the initial root solver GPU, where the initial root solver GPU is the root of the initial binary tree architecture, (7) calculating, by the initial set of GPUs, initial gradients and a set of initial adjusted weight data with respect to the weight data and the initial set of multidimensional data via the initial binary tree architecture, (8) in response to the calculating the initial gradients and the initial adjusted weight data, identifying, by the host computer processor, a first GPU among the available GPUs to become idle (first currently idle GPU) for a current iteration of deep learning, (9) choosing, by the host computer processor, the first currently idle GPU as a current root solver GPU for the current iteration, (10) transmitting, by the host computer processor, a current set of multidimensional data to the current root solver GPU, (11) in response to the identifying the first currently idle GPU, identifying, by the host computer processor, additional GPUs that are currently idle (additional currently idle GPUs) among the available GPUs, (12) transmitting, by the host computer processor, the current set of multidimensional data to the additional currently idle GPUs, (13) forming, by the host computer processor, a current set of GPUs into a current binary tree architecture, where the current set includes the additional currently idle GPUs and the current root solver GPU, where the current root solver GPU is the root of the current binary tree architecture, (14) calculating, by the current set of GPUs, current gradients and a set of current adjusted weight data with respect to at least the weight data and the current set of multidimensional data via the current binary tree architecture, (15) in response to the initial root solver GPU receiving a set of calculated initial adjusted weight data, transmitting, by the initial root solver GPU, an initial update to the weight data to the available GPUs, (16) in response to the current root solver GPU receiving a set of current initial adjusted weight data, transmitting, by the current root solver GPU, a current update to the weight data to the available GPUs, and (17) repeating the identifying, the choosing, the transmitting, the forming, and the calculating with respect to the weight data, updates to the weight data, and subsequent sets of multidimensional data.

Definitions

Graphic Processor Unit (GPU)

A graphic processor unit/graphics processing unit (GPU) (i.e., a visual processing unit (VPU)) is a specialized electronic circuit designed to rapidly manipulate and alter memory to accelerate the creation of images in a frame buffer intended for output to a display device. GPUs are used in embedded systems, mobile phones, personal computers, workstations, and game consoles. Modern GPUs are very efficient at manipulating computer graphics and image processing, and their highly parallel structure makes them more efficient than general-purpose central processing units (CPUs) for algorithms where the processing of large blocks of data is done in parallel. In a personal computer, a GPU can be present on a video card, or it can be embedded on the motherboard or, in certain CPUs, on the CPU die.

Modern GPUs use most of their transistors to do calculations related to three-dimensional (3D) computer graphics. They were initially used to accelerate the memory-intensive work of texture mapping and rendering polygons, later adding units to accelerate geometric calculations such as the rotation and translation of vertices into different coordinate systems. Recent developments in GPUs include support for programmable shaders which can manipulate vertices and textures with many of the same operations supported by CPUs, oversampling and interpolation techniques to reduce aliasing, and very high-precision color spaces. Because most of these computations involve matrix and vector operations, the use of GPUs for non-graphical calculations has been studied, revealing that GPUs are especially suited to other embarrassingly parallel computation problems. In addition to the 3D hardware, today's GPUs include basic two-dimensional (2D) acceleration and framebuffer capabilities (usually with a video graphics adapter (VGA) compatibility mode). GPUs can accelerate a number of video decoding processes, such as (a) motion compensation (mocomp), (b) inverse discrete cosine transform (iDCT) (including inverse telecine 3:2 and 2:2 pull-down correction), (c) inverse modified discrete cosine transform (iMDCT), (d) in-loop deblocking filter, (e) intra-frame prediction, (f) inverse quantization (IQ), (g) variable-length decoding (VLD) (i.e., slice-level acceleration), (h) spatial-temporal deinterlacing and automatic interlace/progressive source detection, and (i) bitstream processing (context-adaptive variable-length coding/context-adaptive binary arithmetic coding) and perfect pixel positioning.

Dedicated Graphics Cards

GPUs of the most powerful class of GPUs typically interface with the motherboard of a computer system by means of an expansion slot and can usually be replaced or upgraded with relative ease, assuming the motherboard is capable of supporting the upgrade. A dedicated GPU is not necessarily removable, nor does it necessarily interface with the motherboard in a standard fashion. The term "dedicated" refers to the fact that dedicated graphics cards have random access memory (RAM) that is dedicated to the card's use, not to the fact that most dedicated GPUs are removable. Further, this RAM is usually specially selected for the expected serial workload of the graphics card. Dedicated GPUs for portable computers are most commonly interfaced through a non-standard and often proprietary slot due to size and weight constraints. Some dedicated graphics cards allow multiple GPUs to draw images simultaneously for a single screen, increasing the processing power available for graphics.

Integrated Graphics

Integrated graphics, shared graphics solutions, integrated graphics processors (IGP) or unified memory architecture (UMA) utilize a portion of a computer's system RAM rather than dedicated graphics memory. IGPs can be integrated onto the motherboard as part of the chipset, or on the same die with the CPU. On certain motherboards, IGPs can use dedicated sideport memory that is a separate fixed block of high performance memory that is dedicated for use by the GPU. Modern integrated graphics processors are more than capable of handling 2D graphics or low stress 3D graphics.

As a GPU is extremely memory intensive, integrated processing may find itself competing for the already relatively slow system RAM with the CPU, as it has minimal or no dedicated video memory. IGPs can have up to 29.856 GB/s of memory bandwidth from system RAM, however graphics cards can enjoy up to 264 GB/s of bandwidth between its RAM and GPU core. This bandwidth is what is referred to as the memory bus and can be performance limiting. Current integrated graphics chipsets include hardware transform and lighting.

Hybrid Graphics Processing

Hybrid graphics processing GPUs compete with integrated graphics in the low-end desktop and notebook markets. Hybrid graphics cards are somewhat more expensive than integrated graphics, but much less expensive than dedicated graphics cards. Hybrid graphics cards share memory with the system and have a small dedicated memory cache, to make up for the high latency of the system RAM.

Stream Processing with GPUs

It is becoming increasingly common to use a general purpose GPU (GPGPU) as a modified form of stream processor (or a vector processor), running compute kernels. GPGPUs turn the computational power of a modern graphics accelerator's shader pipeline into general-purpose computing power, as opposed to being hard wired solely to do graphical operations. In certain applications requiring massive vector operations, using GPGPUs can yield several orders of magnitude higher performance than a conventional CPU. For example, GPGPUs have been used to perform protein folding calculations. In certain circumstances the GPU calculates forty times faster than the conventional CPUs traditionally used by such applications.

GPGPUs can be used for many types of embarrassingly parallel tasks including ray tracing. GPGPUs are generally suited to high-throughput type computations that exhibit data-parallelism to exploit the wide vector width single instruction, multiple data (SIMD) architecture of the GPU.

Furthermore, GPU-based high performance computers are starting to play a significant role in large-scale modelling. Three of the 10 most powerful supercomputers in the world take advantage of GPU acceleration. Certain GPUs support application programming interface (API) extensions to certain computer programming languages (e.g., C programming language), that allow specified functions called compute kernels from a normal computer program (e.g., C program) to run on the GPU's stream processors. This makes such computer programs (e.g., C programs) capable of taking advantage of a GPU's ability to operate on large buffers in parallel, while still making use of the CPU when appropriate. Some such API extension allow CPU-based applications to directly access the resources of a GPU for more general purpose computing without the limitations of using a graphics API.

There has also been interest in using the performance offered by GPUs for evolutionary computation in general, and for accelerating the fitness evaluation in genetic programming in particular. Most such approaches compile linear or tree programs on the host PC and transfer the executable to the GPU to be run. Typically the performance advantage is only obtained by running the single active program simultaneously on many example problems in parallel, using the GPU's SIMD architecture. However, substantial acceleration can also be obtained by not compiling the programs, and instead transferring them to the GPU, to be interpreted there. Acceleration can then be obtained by either interpreting multiple programs simultaneously, simultaneously running multiple example problems, or combinations of both. A modern GPU can readily simultaneously interpret hundreds of thousands of very small programs.

External GPU (eGPU)

An external GPU is a graphics processor located outside of the housing of the computer. External graphics processors are sometimes used with laptop computers. Laptops might have a substantial amount of RAM and a sufficiently powerful central processing unit (CPU), but often lack a powerful graphics processor (and instead have a less powerful but more energy-efficient on-board graphics chip). On-board graphics chips are often not powerful enough for playing the latest games, or for other tasks (video editing). Therefore, it is desirable to be able to attach a GPU to some external bus of a notebook.

Deep Learning

Deep learning (i.e., deep structured learning, hierarchical learning, deep machine learning) is a branch of machine learning based on a set of algorithms that attempt to model high level abstractions in data. In a simple case, deep learning may involve two sets of neurons/computer systems representing neuros: ones that receive an input signal and ones that send an output signal. When the input layer receives an input, the input layer passes on a modified version of the input to the next layer. In a deep network, there are many layers between the input and output, allowing the algorithm to use multiple processing layers, composed of multiple linear and non-linear transformations.

Deep learning is part of a broader family of machine learning methods based on learning representations of data. An observation (e.g., an image) can be represented in many ways such as a vector of intensity values per pixel, or in a more abstract way as a set of edges, regions of particular shape. Some representations are better than others at simplifying the learning task (e.g., face recognition or facial expression recognition). One of the promises of deep learning is replacing handcrafted features with efficient algorithms for unsupervised or semi-supervised feature learning and hierarchical feature extraction. There have been attempts to make better representations and create models to learn these representations from large-scale unlabeled data. Some of the representations are inspired by advances in neuroscience and are loosely based on interpretation of information processing and communication patterns in a nervous system, such as neural coding which attempts to define a relationship between various stimuli and associated neuronal responses in the brain. Various deep learning architectures such as deep neural networks, convolutional deep neural networks, deep belief networks and recurrent neural networks have been applied to fields like computer vision, automatic speech recognition, natural language processing, audio recognition and bioinformatics where they have been shown to produce state-of-the-art results on various tasks. Deep learning has been characterized as a buzzword, or a rebranding of neural networks.

Deep learning is characterized as a class of machine learning algorithms. Such deep learning algorithms use a cascade of many layers of nonlinear processing units for feature extraction and transformation, where each successive layer uses the output from the previous layer as input. The algorithms may be supervised or unsupervised, and applications include pattern analysis (unsupervised) and classification (supervised). Deep learning algorithms are based on the (unsupervised) learning of multiple levels of features or representations of the data such that higher level features are derived from lower level features to form a hierarchical representation. Deep learning algorithms learn multiple levels of representations that correspond to different levels of abstraction where the levels form a hierarchy of concepts.

Deep learning algorithms use multiple layers of nonlinear processing units and involve the supervised or unsupervised learning of feature representations in each layer, with the layers forming a hierarchy from low-level to high-level features. The composition of a layer of nonlinear processing units used in a deep learning algorithm depends on the problem to be solved. Layers of nonlinear processing units that have been used in deep learning may include hidden layers of an artificial neural network and sets of complicated propositional formulas and may also include latent variables organized layer-wise in deep generative models such as the nodes in deep belief networks (DBNs) (a probabilistic, generative model made up of multiple layers of hidden units, a composition of simple learning modules that make up each layer) and deep Boltzmann machines (DBMs) (a type of binary pairwise Markov random field (undirected probabilistic graphical model) with multiple layers of hidden random variables).

Deep learning algorithms transform their inputs through more layers than shallow learning algorithms. At each layer, the signal is transformed by a processing unit, like an artificial neuron, whose parameters are learned through training, such that a chain of transformations from input to output forms a credit assignment path (CAP). CAPs describe potentially causal connections between input and output and may vary in length. For example, for a feedforward neural network, the depth of the CAPs (thus of the network) is the number of hidden layers plus one (as the output layer is also parameterized). However, for recurrent neural networks, in which a signal may propagate through a layer more than once, the CAP is potentially unlimited in length. There is no universally agreed upon threshold of depth dividing shallow learning from deep learning, but it has been determined that deep learning has multiple nonlinear layers (CAP>2), where CAP>10 has been determined to be very deep learning.

Deep learning algorithms are based on distributed representations where the underlying assumption behind distributed representations is that observed data are generated by the interactions of factors organized in layers. Deep learning adds the assumption that these layers of factors correspond to levels of abstraction or composition such that varying numbers of layers and layer sizes can be used to provide different amounts of abstraction. Deep learning exploits this idea of hierarchical explanatory factors where higher level, more abstract concepts are learned from the lower level ones where such architectures are often constructed with a greedy layer-by-layer method. Deep learning helps to disentangle these abstractions and pick out which features are useful for learning.

For supervised learning tasks, deep learning methods obviate feature engineering, by translating the data into compact intermediate representations akin to principal components, and derive layered structures which remove redundancy in representation. Many deep learning algorithms are applied to unsupervised learning task, which is an important benefit because unlabeled data are usually more abundant than labeled data. Examples of deep structures that can be trained in an unsupervised manner are neural history compressors and deep belief networks.

Deep Learning Architectures

Many variants of deep learning architectures exist. Most of them are branched from some original parent architectures.

Deep Neural Networks

A deep neural network (DNN) is an artificial neural network (ANN) with multiple hidden layers of units between the input and output layers. Similar to shallow ANNs, DNNs can model complex non-linear relationships. DNN architectures (e.g., for object detection and parsing) generate compositional models where the object is expressed as a layered composition of image primitives, where the extra layers enable composition of features from lower layers, giving the potential of modeling complex data with fewer units than a similarly performing shallow network.

DNNs are typically designed as feedforward networks, but research has very successfully applied recurrent neural networks, especially LSTM, for applications such as language modeling. Convolutional deep neural networks (CNNs) has been used in computer vision successfully. CNNs also have been applied to acoustic modeling for automatic speech recognition (ASR), where they have shown success over previous models.

Backpropagation

A DNN can be discriminatively trained with the standard backpropagation algorithm. The weight updates of backpropagation can be done via stochastic gradient descent in light of learning rates, cost functions, and stochastic terms. The choice of the cost function depends on factors such as the learning type (supervised, unsupervised, reinforcement, etc.) and the activation function. For example, when performing supervised learning on a multiclass classification problem, common choices for the activation function and cost function are the softmax function and cross entropy function, respectively. These can be used to output object bounding boxes in the form of a binary mask. They are also used for multi-scale regression to increase localization precision. DNN-based regression can learn features that capture geometric information in addition to being a good classifier such that they remove the limitation of designing a model which will capture parts and their relations explicitly, thereby helping to learn a wide variety of objects. The model consists of multiple layers, each of which has a rectified linear unit for non-linear transformation with some layers being convolutional, while others being fully connected. Every convolutional layer has an additional max pooling such that the network is trained to minimize L2 error for predicting the mask ranging over the entire training set containing bounding boxes represented as masks.

Problems with Deep Neural Networks

As with ANNs, many issues can arise with DNNs if they are naively trained. Two common issues are overfitting and computation time. DNNs are prone to overfitting because of the added layers of abstraction, which allow them to model rare dependencies in the training data. Regularization methods such as Ivakhnenko's unit pruning or weight decay or sparsity can be applied during training to help combat overfitting. A more recent regularization method applied to DNNs is dropout regularization, where some number of units are randomly omitted from the hidden layers during training, thereby helping to break the rare dependencies that can occur in the training data.

The dominant method for training DNNs has been error-correction training (such as backpropagation with gradient descent) due to its ease of implementation and its tendency to converge to better local optima than other training methods. However, these methods can be computationally expensive, especially for DNNs because there are many training parameters to be considered with a DNN, such as the size (number of layers and number of units per layer), the learning rate and initial weights. Sweeping through the parameter space for optimal parameters may not be feasible due to the cost in time and computational resources. Various tricks such as using mini-batching (computing the gradient on several training examples at once rather than individual examples) have been shown to speed up computation. The large processing throughput of GPUs has produced significant speedups in training, due to the matrix and vector computations required being well suited for GPUs.

Convolutional Neural Networks

Convolutional neural networks (CNNs) have become the method of choice for processing visual and other two-dimensional data. A CNN is composed of one or more convolutional layers with fully connected layers (matching those in typical artificial neural networks) on top. A CNN uses tied weights and pooling layers such as max-pooling is often used in Fukushima's convolutional architecture that allows CNNs to take advantage of the 2D structure of input data. In comparison with other deep architectures, CNNs have shown superior results in both image and speech applications. CNNs can also be trained with standard back-propagation, are easier to train than other regular, deep, feed-forward neural networks, and have many fewer parameters to estimate, making them a highly attractive architecture to use.

Deep Learning and GPUs

Deep learning is one of the latest fascinating technologies which are helping machines become more human like. In the heart of deep learning are the convolution, recursive, LSTM networks whose ability to parallelize make it a great candidate for running in a GPU. GPUs and deep learning have now become more inseparable because of the quanta of parallelism delivered by the GPUs. However, many application of these networks, such as image recognition and speech recognition, use GPUs less effectively to the point that during the course of the deep learning, there a many periods when some or most of the GPUs are idle. This problem becomes much prevalent with the usage of more GPUs resulting in scaling issues.

There are varied and diverse deep learning algorithms and frameworks. In one deep learning algorithm and framework, the deep learning problem dataset is passed from the host to one of the participating GPUs, where this GPU further breaks the problem into equal size based on the total number of GPUs participating in the learning, such that once the gradients are computed in the GPUs, the gradients are passed to the first GPU (root solver) host for weight adjustment. In another deep learning algorithm and framework, the dataset is passed equally from the host to all the participating GPUs such that once the gradients are computed in the GPUs, the gradients are passed to the host (root solver) for weight adjustment. Also, in another deep learning algorithm and framework, the dataset is passed from the host to one of the participating GPUs, then this GPU pushes the data stepwise in a (binary) tree format to the other participating GPUs, and once the gradients are computed in the GPUs, the gradients are passed step wise to the preceding GPU in the host and finally to the main GPU (root solver) for weight adjustment.

Such deep learning algorithms and frameworks may work quite good with lesser number of GPUs because the passing of gradients from one GPU to another and the subsequent wait time in those GPUs, until the root solver collates and computes the weights, would be very small with lesser number of GPU's. However, as the number of GPUs increases in such deep learning algorithms and frameworks, the different GPUs after transferring their gradients to the root solver have to wait (or stay idle) until all the other GPUs and the root solver complete their transfer or computes the weights respectively, such that the wait time increases as a function of the number of GPUs in such algorithms and frameworks.

Generally, when deep learning is performed for multidimensional data (e.g., using deep learning for image recognition), a host computer processor/host plus GPU combination is used. In such an architecture/combination, the complete training dataset (e.g., images, speech) present in the host is divided into many mini batches and pushed into the GPUs. Once the computation is complete, the learning weights and gradients are adjusted. Such actions happen in multiple iterations, helping to increase the learning rate with each iteration. A machine learning method may have two phases, a forward and a backward pass. During a forward pass, the host computer processor/host pushes the mini batch to one of the GPUs (called the root solver) which further breaks down the problem and passes it on to the other participating GPUs in a tree format. During the backward pass, each of the GPUs compute the gradient and transfers them back to the parent GPU which computes the weights and does the adjustment, all the way back till the root solver, such that once the GPUs have passed on the data to the parent GPU, the GPUs get to idle state. With larger multi GPU systems, the number of GPUs which get into idle state until the final root solvers complete computation and begin the start of the next iteration is much higher. Also for the next iteration, the root solver is the same and the whole process continues.

Figure 1B:
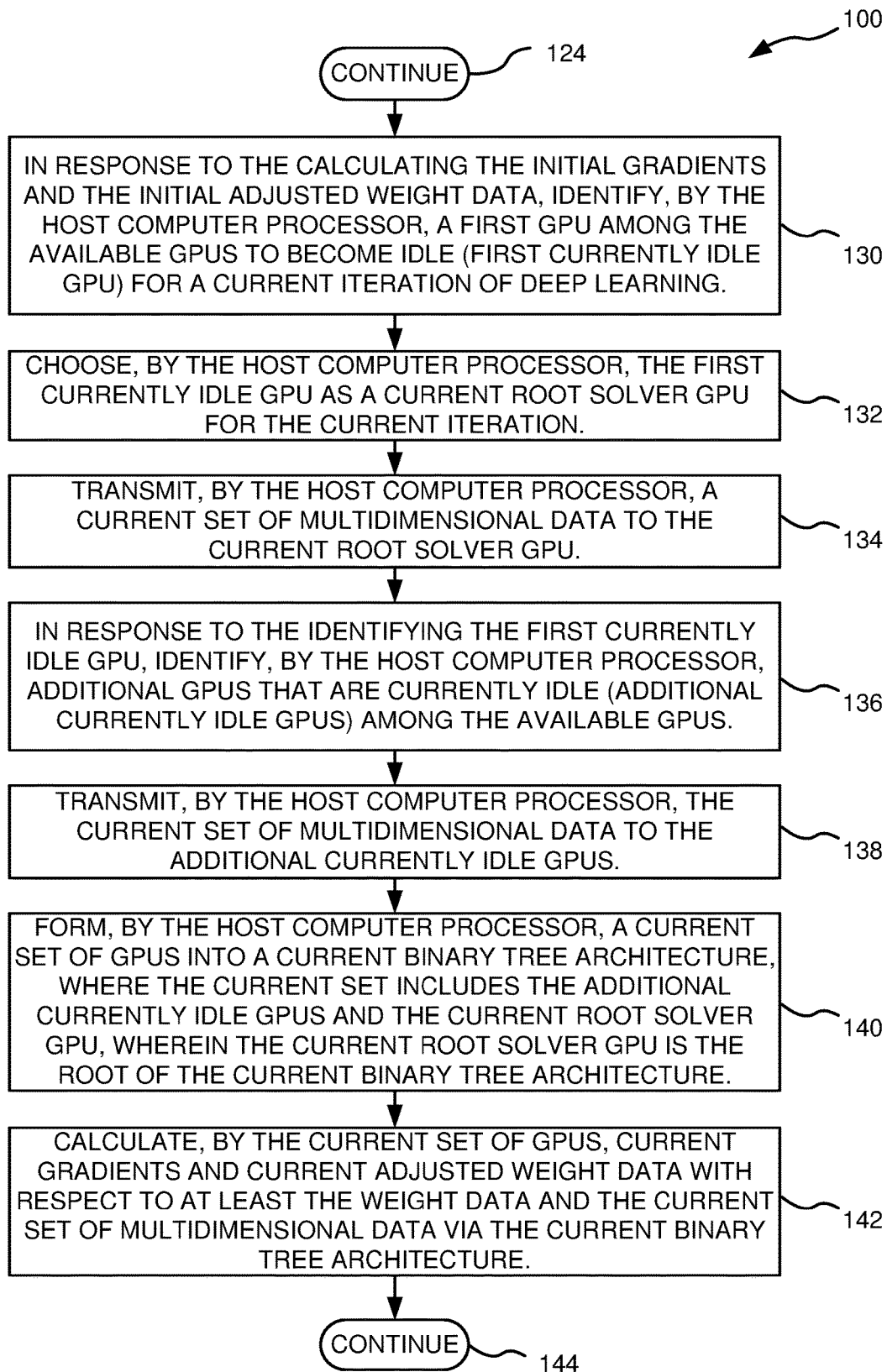
FIG. 1B depicts a flowchart in accordance with an exemplary embodiment of the present invention.
Figure 1C:
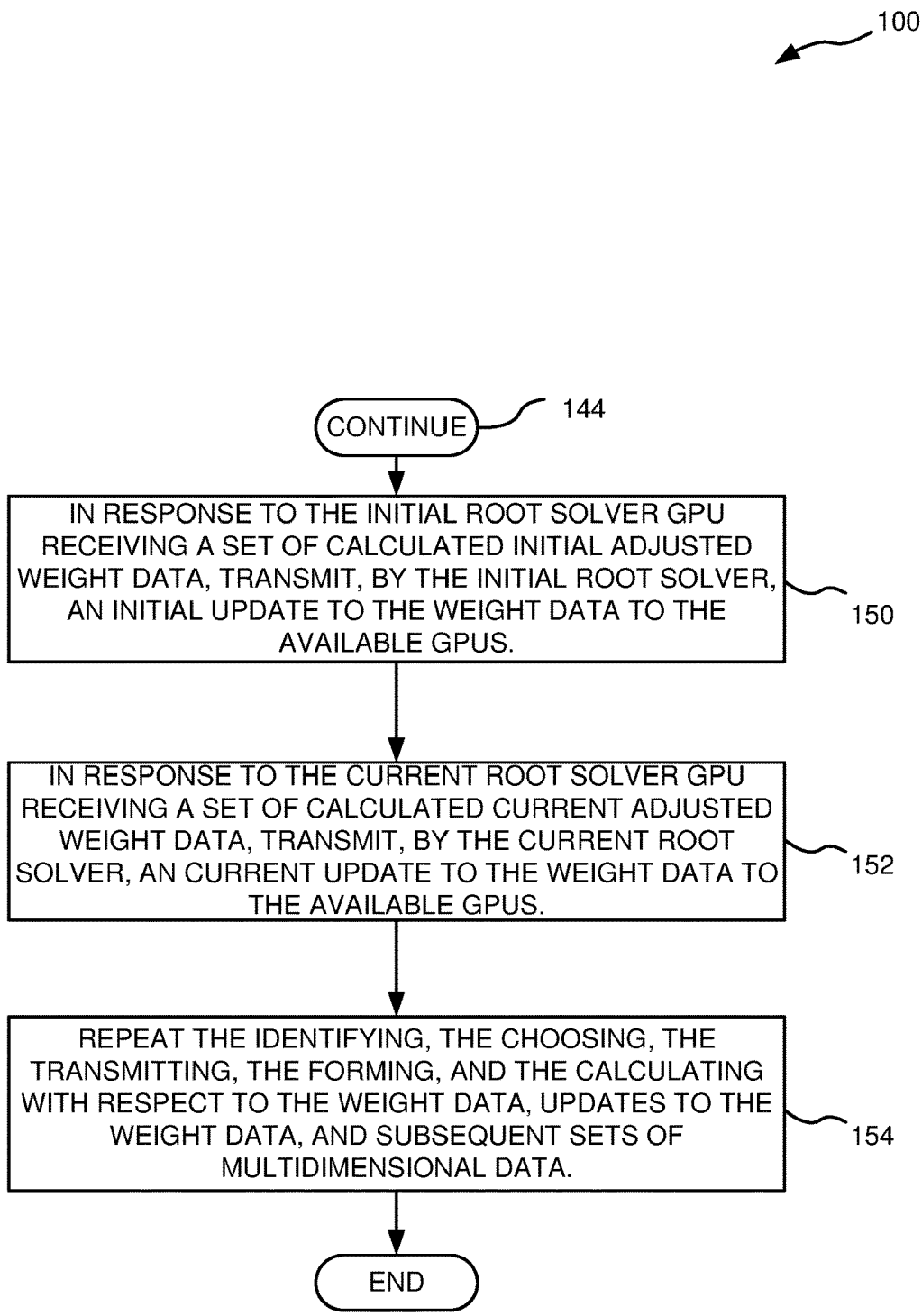
FIG. 1C depicts a flowchart in accordance with an exemplary embodiment of the present invention.

Referring to FIG. 1A, FIG. 1B, and FIG. 1C, in an exemplary embodiment, the present invention is configured to perform an operation 110 of identifying, by a host computer processor, graphic processor units (GPUs) that are available (available GPUs), an operation 112 of identifying, by the host computer processor, GPUs that are idle (initially idle GPUs) among the available GPUs for an initial iteration of deep learning, an operation 114 of choosing, by the host computer processor, one of the initially idle GPUs as an initial root solver GPU for the initial iteration, an operation 116 of initializing, by the host computer processor, weight data for an initial set of multidimensional data, an operation 118 of transmitting, by the host computer processor, the initial set of multidimensional data to the available GPUs, an operation 120 of forming, by the host computer processor, an initial set of GPUs into an initial binary tree architecture, where the initial set includes the initially idle GPUs and the initial root solver GPU, where the initial root solver GPU is the root of the initial binary tree architecture, an operation 122 of calculating, by the initial set of GPUs, initial gradients and a set of initial adjusted weight data with respect to the weight data and the initial set of multidimensional data via the initial binary tree architecture, an operation 130 of in response to the calculating the initial gradients and the initial adjusted weight data, identifying, by the host computer processor, a first GPU among the available GPUs to become idle (first currently idle GPU) for a current iteration of deep learning, an operation 132 of choosing, by the host computer processor, the first currently idle GPU as a current root solver GPU for the current iteration, an operation 134 of transmitting, by the host computer processor, a current set of multidimensional data to the current root solver GPU, an operation 136 of in response to the identifying the first currently idle GPU, identifying, by the host computer processor, additional GPUs that are currently idle (additional currently idle GPUs) among the available GPUs, an operation 138 of transmitting, by the host computer processor, the current set of multidimensional data to the additional currently idle GPUs, an operation 140 of forming, by the host computer processor, a current set of GPUs into a current binary tree architecture, where the current set includes the additional currently idle GPUs and the current root solver GPU, where the current root solver GPU is the root of the current binary tree architecture, an operation 142 of calculating, by the current set of GPUs, current gradients and a set of current adjusted weight data with respect to at least the weight data and the current set of multidimensional data via the current binary tree architecture, an operation 150 of in response to the initial root solver GPU receiving a set of calculated initial adjusted weight data, transmitting, by the initial root solver GPU, an initial update to the weight data to the available GPUs, an operation 152 of in response to the current root solver GPU receiving a set of current initial adjusted weight data, transmitting, by the current root solver GPU, a current update to the weight data to the available GPUs, and an operation 154 of repeating the identifying, the choosing, the transmitting, the forming, and the calculating with respect to the weight data, updates to the weight data, and subsequent sets of multidimensional data.

In an embodiment, the present invention makes use of a dynamic root solver. For example, in the many iterations (i.e., mini batch computation) that a deep learning algorithm executes in order to perform learning, the GPU which completes its work early during a mini batch iteration could start to get the next dataset from the host computer processor/host to start the processing, hence acting as the new root solver for the next mini batch iteration. In an embodiment, the new root solver splits the dataset and coordinates with the other GPUs which are idle, and at a point, the previous root solver becomes a participating GPU in the new iteration, where such using of dynamic root solvers continues to happen for all the iterations of the deep learning with each iteration selecting a dynamic root solver and not waiting for the dataset to be completely learned. The present invention may increase the performance of deep learning with an increasing number of GPUs. In an embodiment, the present invention uses a dynamic root solver to increase the training of deep learning networks in a scalable GPU environment.

Figure 5:
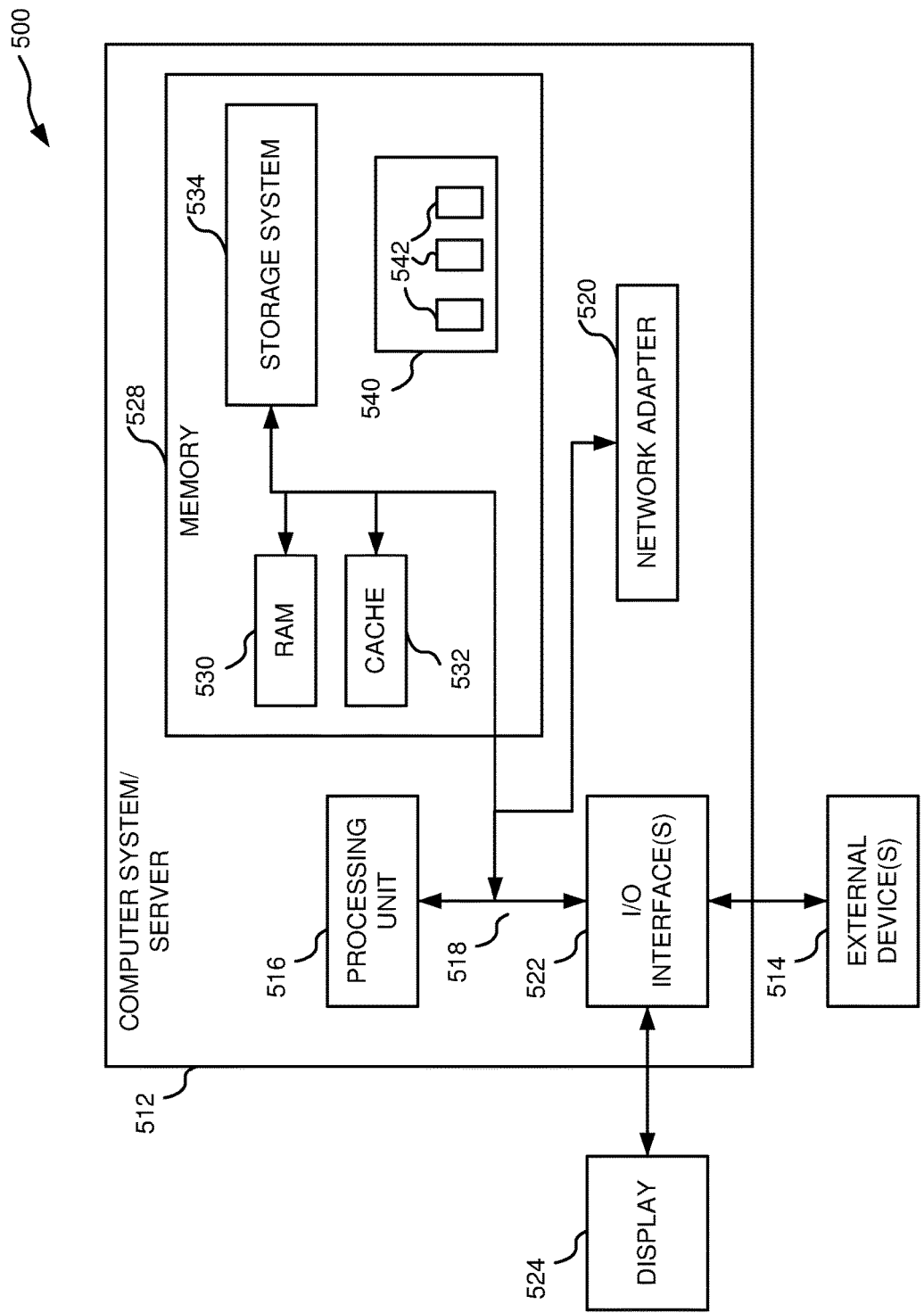
FIG. 5 depicts a computer system in accordance with an exemplary embodiment of the present invention.

In an embodiment, the host computer processor is a computer system 500 as shown in FIG. 5, that executes a deep learning via dynamic root solvers script or computer software application that carries out the operations of at least method 100. In an embodiment, the host computer processor is a computer system/server 512 as shown in FIG. 5, that executes a deep learning via dynamic root solvers script or computer software application that carries out the operations of at least method 100. In an embodiment, the host computer processor is a processing unit 516 as shown in FIG. 5, that executes a deep learning via dynamic root solvers script or computer software application that carries out the operations of at least method 100. In an embodiment, the host computer processor is a computer system 500 as shown in FIG. 5, that executes a deep learning via dynamic root solvers script or computer software application that carries out at least operations 110, 112, 114, 116, 118, 120, 130, 132, 134, 136, 138, and 140. In an embodiment, the host computer processor is a computer system/server 512 as shown in FIG. 5, that executes a bandwidth optimizing script or computer software application that carries out at least operations 110, 112, 114, 116, 118, 120, 130, 132, 134, 136, 138, and 140. In an embodiment, the host computer processor is a processing unit 516 as shown in FIG. 5, that executes a bandwidth optimizing script or computer software application that carries out at least operations 110, 112, 114, 116, 118, 120, 130, 132, 134, 136, 138, and 140.

In an embodiment, each member of initial set of GPUs 164 is a computer system 500 as shown in FIG. 5, that executes a deep learning via dynamic root solvers script or computer software application that carries out the operations of at least method 100. In an embodiment, each member of initial set of GPUs 164 is a computer system/server 512 as shown in FIG. 5, that executes a deep learning via dynamic root solvers script or computer software application that carries out the operations of at least method 100. In an embodiment, each member of initial set of GPUs 164 is a processing unit 516 as shown in FIG. 5, that executes a deep learning via dynamic root solvers script or computer software application that carries out the operations of at least method 100. In an embodiment, each member of initial set of GPUs 164 is a graphic processor unit/graphics processing unit/visual processing unit that executes a deep learning via dynamic root solvers script or computer software application that carries out the operations of at least method 100. In an embodiment, each member of initial set of GPUs 164 is a computer system 500 as shown in FIG. 5, that executes a deep learning via dynamic root solvers script or computer software application that carries out at least operation 122. In an embodiment, each member of initial set of GPUs 164 is a computer system/server 512 as shown in FIG. 5, that executes a bandwidth optimizing script or computer software application that carries out at least operation 122. In an embodiment, each member of initial set of GPUs 164 is a processing unit 516 as shown in FIG. 5, that executes a bandwidth optimizing script or computer software application that carries out at least operation 122. In an embodiment, each member of initial set of GPUs 164 is a graphic processor unit/graphics processing unit/visual processing unit that executes a bandwidth optimizing script or computer software application that carries out at least operation 122.

In an embodiment, each member of current set of GPUs 168 is a computer system 500 as shown in FIG. 5, that executes a deep learning via dynamic root solvers script or computer software application that carries out the operations of at least method 100. In an embodiment, each member of current set of GPUs 168 is a computer system/server 512 as shown in FIG. 5, that executes a deep learning via dynamic root solvers script or computer software application that carries out the operations of at least method 100. In an embodiment, each member of current set of GPUs 168 is a processing unit 516 as shown in FIG. 5, that executes a deep learning via dynamic root solvers script or computer software application that carries out the operations of at least method 100. In an embodiment, each member of current set of GPUs 168 is a graphic processor unit/graphics processing unit/visual processing unit that executes a deep learning via dynamic root solvers script or computer software application that carries out the operations of at least method 100. In an embodiment, each member of current set of GPUs 168 is a computer system 500 as shown in FIG. 5, that executes a deep learning via dynamic root solvers script or computer software application that carries out at least operation 142. In an embodiment, each member of current set of GPUs 168 is a computer system/server 512 as shown in FIG. 5, that executes a bandwidth optimizing script or computer software application that carries out at least operation 142. In an embodiment, each member of current set of GPUs 168 is a processing unit 516 as shown in FIG. 5, that executes a bandwidth optimizing script or computer software application that carries out at least operation 142. In an embodiment, each member of current set of GPUs 168 is a graphic processor unit/graphics processing unit/visual processing unit that executes a bandwidth optimizing script or computer software application that carries out at least operation 142.

In an embodiment, initial root solver 162 is a computer system 500 as shown in FIG. 5, that executes a deep learning via dynamic root solvers script or computer software application that carries out the operations of at least method 100. In an embodiment, initial root solver 162 is a computer system/server 512 as shown in FIG. 5, that executes a deep learning via dynamic root solvers script or computer software application that carries out the operations of at least method 100. In an embodiment, initial root solver 162 is a processing unit 516 as shown in FIG. 5, that executes a deep learning via dynamic root solvers script or computer software application that carries out the operations of at least method 100. In an embodiment, initial root solver 162 is a graphic processor unit/graphics processing unit/visual processing unit that executes a deep learning via dynamic root solvers script or computer software application that carries out the operations of at least method 100. In an embodiment, initial root solver 162 is a computer system 500 as shown in FIG. 5, that executes a deep learning via dynamic root solvers script or computer software application that carries out at least operation 150. In an embodiment, initial root solver 162 is a computer system/server 512 as shown in FIG. 5, that executes a bandwidth optimizing script or computer software application that carries out at least operation 150. In an embodiment, initial root solver 162 is a processing unit 516 as shown in FIG. 5, that executes a bandwidth optimizing script or computer software application that carries out at least operation 150. In an embodiment, initial root solver 162 is a graphic processor unit/graphics processing unit/visual processing unit that executes a bandwidth optimizing script or computer software application that carries out at least operation 150.

In an embodiment, current root solver 166 is a computer system 500 as shown in FIG. 5, that executes a deep learning via dynamic root solvers script or computer software application that carries out the operations of at least method 100. In an embodiment, current root solver 166 is a computer system/server 512 as shown in FIG. 5, that executes a deep learning via dynamic root solvers script or computer software application that carries out the operations of at least method 100. In an embodiment, current root solver 166 is a processing unit 516 as shown in FIG. 5, that executes a deep learning via dynamic root solvers script or computer software application that carries out the operations of at least method 100. In an embodiment, current root solver 166 is a graphic processor unit/graphics processing unit/visual processing unit that executes a deep learning via dynamic root solvers script or computer software application that carries out the operations of at least method 100. In an embodiment, current root solver 166 is a computer system 500 as shown in FIG. 5, that executes a deep learning via dynamic root solvers script or computer software application that carries out at least operation 152. In an embodiment, current root solver 166 is a computer system/server 512 as shown in FIG. 5, that executes a bandwidth optimizing script or computer software application that carries out at least operation 152. In an embodiment, current root solver 166 is a processing unit 516 as shown in FIG. 5, that executes a bandwidth optimizing script or computer software application that carries out at least operation 152. In an embodiment, current root solver 166 is a graphic processor unit/graphics processing unit/visual processing unit that executes a bandwidth optimizing script or computer software application that carries out at least operation 152.

Figure 1D:
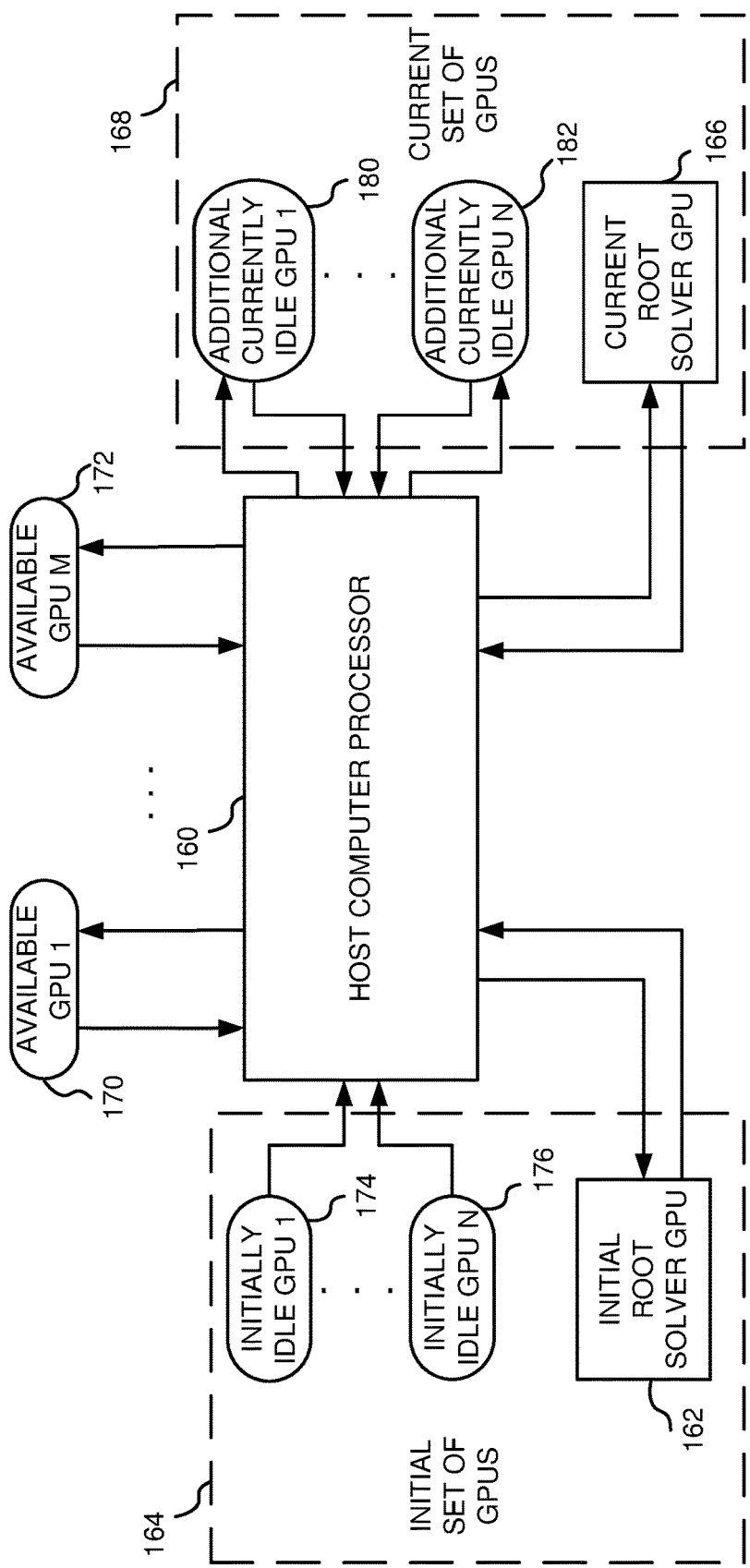
FIG. 1D depicts a block diagram in accordance with an exemplary embodiment of the present invention.

Referring to FIG. 1D, in an exemplary embodiment, the present invention includes a host computer processor 160, an initial root solver GPU 162, an initial set of GPUs 164, a current root solver 166, and a current set of GPUs 168. In an embodiment, host computer processor 160 is configured to identify graphic processor units (GPUs) that are available (available GPUs 170, 172). In an embodiment, host computer processor 160 includes a computer system, such as computer system 500 as shown in FIG. 5, performing operation 110. In an embodiment, host computer processor 160 includes a computer system, such as computer system/server 512 as shown in FIG. 5, performing operation 110. In an embodiment, host computer processor 160 includes a computer system, such as processing unit 516 as shown in FIG. 5, performing operation 110. In an embodiment, host computer processor 160 is implemented as computer software executing on a computer system, such as computer system 500 as shown in FIG. 5, such that the computer system performs operation 110. In an embodiment, host computer processor 160 is implemented as computer software executing on a computer system, such as computer system/server 512 as shown in FIG. 5, such that the computer system performs operation 110. In an embodiment, host computer processor 160 is implemented as computer software executing on a computer system, such as processing unit 516 as shown in FIG. 5, such that the computer system performs operation 110.

In an embodiment, host computer processor 160 is configured to identify GPUs that are idle (initially idle GPUs 174, 176) among available GPUs 170, 172 for an initial iteration of deep learning. In an embodiment, host computer processor 160 includes a computer system, such as computer system 500 as shown in FIG. 5, performing operation 112. In an embodiment, host computer processor 160 includes a computer system, such as computer system/server 512 as shown in FIG. 5, performing operation 112. In an embodiment, host computer processor 160 includes a computer system, such as processing unit 516 as shown in FIG. 5, performing operation 112. In an embodiment, host computer processor 160 is implemented as computer software executing on a computer system, such as computer system 500 as shown in FIG. 5, such that the computer system performs operation 112. In an embodiment, host computer processor 160 is implemented as computer software executing on a computer system, such as computer system/server 512 as shown in FIG. 5, such that the computer system performs operation 112. In an embodiment, host computer processor 160 is implemented as computer software executing on a computer system, such as processing unit 516 as shown in FIG. 5, such that the computer system performs operation 112.

In an embodiment, host computer processor 160 is configured to choose one of initially idle GPUs 174, 176 as initial root solver GPU 162 for the initial iteration. In an embodiment, host computer processor 160 includes a computer system, such as computer system 500 as shown in FIG. 5, performing operation 114. In an embodiment, host computer processor 160 includes a computer system, such as computer system/server 512 as shown in FIG. 5, performing operation 114. In an embodiment, host computer processor 160 includes a computer system, such as processing unit 516 as shown in FIG. 5, performing operation 114. In an embodiment, host computer processor 160 is implemented as computer software executing on a computer system, such as computer system 500 as shown in FIG. 5, such that the computer system performs operation 114. In an embodiment, host computer processor 160 is implemented as computer software executing on a computer system, such as computer system/server 512 as shown in FIG. 5, such that the computer system performs operation 114. In an embodiment, host computer processor 160 is implemented as computer software executing on a computer system, such as processing unit 516 as shown in FIG. 5, such that the computer system performs operation 114.

In an embodiment, host computer processor 160 is configured to initialize weight data for an initial set of multidimensional data. In an embodiment, host computer processor 160 includes a computer system, such as computer system 500 as shown in FIG. 5, performing operation 116. In an embodiment, host computer processor 160 includes a computer system, such as computer system/server 512 as shown in FIG. 5, performing operation 116. In an embodiment, host computer processor 160 includes a computer system, such as processing unit 516 as shown in FIG. 5, performing operation 116. In an embodiment, host computer processor 160 is implemented as computer software executing on a computer system, such as computer system 500 as shown in FIG. 5, such that the computer system performs operation 116. In an embodiment, host computer processor 160 is implemented as computer software executing on a computer system, such as computer system/server 512 as shown in FIG. 5, such that the computer system performs operation 116. In an embodiment, host computer processor 160 is implemented as computer software executing on a computer system, such as processing unit 516 as shown in FIG. 5, such that the computer system performs operation 116.

In an embodiment, host computer processor 160 is configured to transmit the initial set of multidimensional data to available GPUs 170, 172. In an embodiment, host computer processor 160 includes a computer system, such as computer system 500 as shown in FIG. 5, performing operation 118. In an embodiment, host computer processor 160 includes a computer system, such as computer system/server 512 as shown in FIG. 5, performing operation 118. In an embodiment, host computer processor 160 includes a computer system, such as processing unit 516 as shown in FIG. 5, performing operation 118. In an embodiment, host computer processor 160 is implemented as computer software executing on a computer system, such as computer system 500 as shown in FIG. 5, such that the computer system performs operation 118. In an embodiment, host computer processor 160 is implemented as computer software executing on a computer system, such as computer system/server 512 as shown in FIG. 5, such that the computer system performs operation 118. In an embodiment, host computer processor 160 is implemented as computer software executing on a computer system, such as processing unit 516 as shown in FIG. 5, such that the computer system performs operation 118.

In an embodiment, host computer processor 160 is configured to form initial set of GPUs 164 into an initial binary tree architecture, where initial set of GPUs 164 includes initially idle GPUs 174, 176 and initial root solver GPU 162, where initial root solver GPU 162 is the root of the initial binary tree architecture. In an embodiment, host computer processor 160 includes a computer system, such as computer system 500 as shown in FIG. 5, performing operation 120. In an embodiment, host computer processor 160 includes a computer system, such as computer system/server 512 as shown in FIG. 5, performing operation 120. In an embodiment, host computer processor 160 includes a computer system, such as processing unit 516 as shown in FIG. 5, performing operation 120. In an embodiment, host computer processor 160 is implemented as computer software executing on a computer system, such as computer system 500 as shown in FIG. 5, such that the computer system performs operation 120. In an embodiment, host computer processor 160 is implemented as computer software executing on a computer system, such as computer system/server 512 as shown in FIG. 5, such that the computer system performs operation 120. In an embodiment, host computer processor 160 is implemented as computer software executing on a computer system, such as processing unit 516 as shown in FIG. 5, such that the computer system performs operation 120.

In an embodiment, initial set of GPUs 164 is configured to calculate initial gradients and a set of initial adjusted weight data with respect to the weight data and the initial set of multidimensional data via the initial binary tree architecture. In an embodiment, each member of initial set of GPUs 164 includes a computer system, such as computer system 500 as shown in FIG. 5, with initial set of GPUs 164 performing operation 122. In an embodiment, each member of initial set of GPUs 164 includes a computer system, such as computer system/server 512 as shown in FIG. 5, with initial set of GPUs 164 performing operation 122. In an embodiment, each member of initial set of GPUs 164 includes a computer system, such as processing unit 516 as shown in FIG. 5, with initial set of GPUs 164 performing operation 122. In an embodiment, each member of initial set of GPUs 164 includes a computer system, such as a graphic processor unit/graphics processing unit/visual processing unit, with initial set of GPUs 164 performing operation 122. In an embodiment, each member of initial set of GPUs 164 is implemented as computer software executing on a computer system, such as computer system 500 as shown in FIG. 5, such that initial set of GPUs 164 performs operation 122. In an embodiment, each member of initial set of GPUs 164 is implemented as computer software executing on a computer system, such as computer system/server 512 as shown in FIG. 5, such that initial set of GPUs 164 performs operation 122. In an embodiment, each member of initial set of GPUs 164 is implemented as computer software executing on a computer system, such as processing unit 516 as shown in FIG. 5, such that initial set of GPUs 164 performs operation 122. In an embodiment, each member of initial set of GPUs 164 is implemented as computer software executing on a computer system, such as a graphic processor unit/graphics processing unit/visual processing unit, such that initial set of GPUs 164 performs operation 122.

In an embodiment, host computer processor 160 is configured to identify, in response to the calculating the initial gradients and the initial adjusted weight data, a first GPU among available GPUs 170, 172 to become idle (first currently idle GPU) for a current iteration of deep learning. In an embodiment, host computer processor 160 includes a computer system, such as computer system 500 as shown in FIG. 5, performing operation 130. In an embodiment, host computer processor 160 includes a computer system, such as computer system/server 512 as shown in FIG. 5, performing operation 130. In an embodiment, host computer processor 160 includes a computer system, such as processing unit 516 as shown in FIG. 5, performing operation 130. In an embodiment, host computer processor 160 is implemented as computer software executing on a computer system, such as computer system 500 as shown in FIG. 5, such that the computer system performs operation 130. In an embodiment, host computer processor 160 is implemented as computer software executing on a computer system, such as computer system/server 512 as shown in FIG. 5, such that the computer system performs operation 130. In an embodiment, host computer processor 160 is implemented as computer software executing on a computer system, such as processing unit 516 as shown in FIG. 5, such that the computer system performs operation 130.

In an embodiment, host computer processor 160 is configured to choose the first currently idle GPU as current root solver GPU 166 for the current iteration. In an embodiment, host computer processor 160 includes a computer system, such as computer system 500 as shown in FIG. 5, performing operation 132. In an embodiment, host computer processor 160 includes a computer system, such as computer system/server 512 as shown in FIG. 5, performing operation 132. In an embodiment, host computer processor 160 includes a computer system, such as processing unit 516 as shown in FIG. 5, performing operation 132. In an embodiment, host computer processor 160 is implemented as computer software executing on a computer system, such as computer system 500 as shown in FIG. 5, such that the computer system performs operation 132. In an embodiment, host computer processor 160 is implemented as computer software executing on a computer system, such as computer system/server 512 as shown in FIG. 5, such that the computer system performs operation 132. In an embodiment, host computer processor 160 is implemented as computer software executing on a computer system, such as processing unit 516 as shown in FIG. 5, such that the computer system performs operation 132.

In an embodiment, host computer processor 160 is configured to transmit a current set of multidimensional data to current root solver GPU 166. In an embodiment, host computer processor 160 includes a computer system, such as computer system 500 as shown in FIG. 5, performing operation 134. In an embodiment, host computer processor 160 includes a computer system, such as computer system/server 512 as shown in FIG. 5, performing operation 134. In an embodiment, host computer processor 160 includes a computer system, such as processing unit 516 as shown in FIG. 5, performing operation 134. In an embodiment, host computer processor 160 is implemented as computer software executing on a computer system, such as computer system 500 as shown in FIG. 5, such that the computer system performs operation 134. In an embodiment, host computer processor 160 is implemented as computer software executing on a computer system, such as computer system/server 512 as shown in FIG. 5, such that the computer system performs operation 134. In an embodiment, host computer processor 160 is implemented as computer software executing on a computer system, such as processing unit 516 as shown in FIG. 5, such that the computer system performs operation 134.

In an embodiment, host computer processor 160 is configured to identify, in response to the identifying the first currently idle GPU, additional GPUs that are currently idle (additional currently idle GPUs 180, 182) among available GPUs 170, 172. In an embodiment, host computer processor 160 includes a computer system, such as computer system 500 as shown in FIG. 5, performing operation 136. In an embodiment, host computer processor 160 includes a computer system, such as computer system/server 512 as shown in FIG. 5, performing operation 136. In an embodiment, host computer processor 160 includes a computer system, such as processing unit 516 as shown in FIG. 5, performing operation 136. In an embodiment, host computer processor 160 is implemented as computer software executing on a computer system, such as computer system 500 as shown in FIG. 5, such that the computer system performs operation 136. In an embodiment, host computer processor 160 is implemented as computer software executing on a computer system, such as computer system/server 512 as shown in FIG. 5, such that the computer system performs operation 136. In an embodiment, host computer processor 160 is implemented as computer software executing on a computer system, such as processing unit 516 as shown in FIG. 5, such that the computer system performs operation 136.

In an embodiment, host computer processor 160 is configured to transmit the current set of multidimensional data to additional currently idle GPUs 180, 182. In an embodiment, host computer processor 160 includes a computer system, such as computer system 500 as shown in FIG. 5, performing operation 138. In an embodiment, host computer processor 160 includes a computer system, such as computer system/server 512 as shown in FIG. 5, performing operation 138. In an embodiment, host computer processor 160 includes a computer system, such as processing unit 516 as shown in FIG. 5, performing operation 138. In an embodiment, host computer processor 160 is implemented as computer software executing on a computer system, such as computer system 500 as shown in FIG. 5, such that the computer system performs operation 138. In an embodiment, host computer processor 160 is implemented as computer software executing on a computer system, such as computer system/server 512 as shown in FIG. 5, such that the computer system performs operation 138. In an embodiment, host computer processor 160 is implemented as computer software executing on a computer system, such as processing unit 516 as shown in FIG. 5, such that the computer system performs operation 138.

In an embodiment, host computer processor 160 is configured to form current set of GPUs 168 into a current binary tree architecture, where current set of GPUs 168 includes additional currently idle GPUs 180, 182 and current root solver GPU 166, where current root solver GPU 166 is the root of the current binary tree architecture. In an embodiment, host computer processor 160 includes a computer system, such as computer system 500 as shown in FIG. 5, performing operation 140. In an embodiment, host computer processor 160 includes a computer system, such as computer system/server 512 as shown in FIG. 5, performing operation 140. In an embodiment, host computer processor 160 includes a computer system, such as processing unit 516 as shown in FIG. 5, performing operation 140. In an embodiment, host computer processor 160 is implemented as computer software executing on a computer system, such as computer system 500 as shown in FIG. 5, such that the computer system performs operation 140. In an embodiment, host computer processor 160 is implemented as computer software executing on a computer system, such as computer system/server 512 as shown in FIG. 5, such that the computer system performs operation 140. In an embodiment, host computer processor 160 is implemented as computer software executing on a computer system, such as processing unit 516 as shown in FIG. 5, such that the computer system performs operation 140.

In an embodiment, current set of GPUs 168 is configured to calculate current gradients and a set of current adjusted weight data with respect to at least the weight data and the current set of multidimensional data via the current binary tree architecture. In an embodiment, each member of current set of GPUs 168 includes a computer system, such as computer system 500 as shown in FIG. 5, with current set of GPUs 168 performing operation 142. In an embodiment, each member of current set of GPUs 168 includes a computer system, such as computer system/server 512 as shown in FIG. 5, with current set of GPUs 168 performing operation 142. In an embodiment, each member of current set of GPUs 168 includes a computer system, such as processing unit 516 as shown in FIG. 5, with current set of GPUs 168 performing operation 142. In an embodiment, each member of current set of GPUs 168 includes a computer system, such as a graphic processor unit/graphics processing unit/visual processing unit, with current set of GPUs 168 performing operation 142. In an embodiment, each member of current set of GPUs 168 is implemented as computer software executing on a computer system, such as computer system 500 as shown in FIG. 5, such that current set of GPUs 168 performs operation 142. In an embodiment, each member of current set of GPUs 168 is implemented as computer software executing on a computer system, such as computer system/server 512 as shown in FIG. 5, such that current set of GPUs 168 performs operation 142. In an embodiment, each member of current set of GPUs 168 is implemented as computer software executing on a computer system, such as processing unit 516 as shown in FIG. 5, such that current set of GPUs 168 performs operation 142. In an embodiment, each member of current set of GPUs 168 is implemented as computer software executing on a computer system, such as a graphic processor unit/graphics processing unit/visual processing unit, such that current set of GPUs 168 performs operation 142.

In an embodiment, initial root solver 162 is configured to transmit, in response to initial root solver GPU 162 receiving a set of calculated initial adjusted weight data, an initial update to the weight data to available GPUs 170, 172. In an embodiment, initial root solver 162 includes a computer system, such as computer system 500 as shown in FIG. 5, performing operation 150. In an embodiment, initial root solver 162 includes a computer system, such as computer system/server 512 as shown in FIG. 5, performing operation 150. In an embodiment, initial root solver 162 includes a computer system, such as processing unit 516 as shown in FIG. 5, performing operation 150. In an embodiment, initial root solver 162 includes a computer system, such as a graphic processor unit/graphics processing unit/visual processing unit, performing operation 150. In an embodiment, initial root solver 162 is implemented as computer software executing on a computer system, such as computer system 500 as shown in FIG. 5, such that the computer system performs operation 150. In an embodiment, initial root solver 162 is implemented as computer software executing on a computer system, such as computer system/server 512 as shown in FIG. 5, such that the computer system performs operation 150. In an embodiment, initial root solver 162 is implemented as computer software executing on a computer system, such as processing unit 516 as shown in FIG. 5, such that the computer system performs operation 150. In an embodiment, initial root solver 162 is implemented as computer software executing on a computer system, such as a graphic processor unit/graphics processing unit/visual processing unit, such that the computer system performs operation 150.

In an embodiment, current root solver 166 is configured to transmit, in response to current root solver GPU 166 receiving a set of current initial adjusted weight data, a current update to the weight data to available GPUs 170, 172. In an embodiment, current root solver 166 includes a computer system, such as computer system 500 as shown in FIG. 5, performing operation 152. In an embodiment, current root solver 166 includes a computer system, such as computer system/server 512 as shown in FIG. 5, performing operation 152. In an embodiment, current root solver 166 includes a computer system, such as processing unit 516 as shown in FIG. 5, performing operation 152. In an embodiment, current root solver 166 includes a computer system, such as a graphic processor unit/graphics processing unit/ visual processing unit, performing operation 152. In an embodiment, current root solver 166 is implemented as computer software executing on a computer system, such as computer system 500 as shown in FIG. 5, such that the computer system performs operation 152. In an embodiment, current root solver 166 is implemented as computer software executing on a computer system, such as computer system/server 512 as shown in FIG. 5, such that the computer system performs operation 152. In an embodiment, current root solver 166 is implemented as computer software executing on a computer system, such as processing unit 516 as shown in FIG. 5, such that the computer system performs operation 152. In an embodiment, current root solver 166 is implemented as computer software executing on a computer system, such as a graphic processor unit/graphics processing unit/visual processing unit, such that the computer system performs operation 152.

Identifying GPUs that are Idle Among the Available GPUs

In an exemplary embodiment, the identifying GPUs that are idle among the available GPUs includes executing, by the host computer processor, a run command from a central processing unit (CPU) of each of the available GPUs to determine a percentage of the each of the available GPUs being utilized. In an embodiment, identifying GPUs that are idle among the available GPUs operation 112 includes executing, by the host computer processor, a run command from a central processing unit (CPU) of each of the available GPUs to determine a percentage of the each of the available GPUs being utilized. In an embodiment, host computer processor 160 is configured to execute a run command from a central processing unit (CPU) of each of available GPUs 170, 172 to determine a percentage of the each of available GPUs 170, 172 being utilized. In an embodiment, host computer processor 160 includes a computer system, such as computer system 500 as shown in FIG. 5, executing a run command from a central processing unit (CPU) of each of available GPUs 170, 172 to determine a percentage of the each of available GPUs 170, 172 being utilized. In an embodiment, host computer processor 160 includes a computer system, such as computer system/server 512 as shown in FIG. 5, executing a run command from a central processing unit (CPU) of each of available GPUs 170, 172 to determine a percentage of the each of available GPUs 170, 172 being utilized. In an embodiment, host computer processor 160 includes a computer system, such as processing unit 516 as shown in FIG. 5, executing a run command from a central processing unit (CPU) of each of available GPUs 170, 172 to determine a percentage of the each of available GPUs 170, 172 being utilized.

In an embodiment, host computer processor 160 is implemented as computer software executing on a computer system, such as computer system 500 as shown in FIG. 5, such that the computer system executes a run command from a central processing unit (CPU) of each of available GPUs 170, 172 to determine a percentage of the each of available GPUs 170, 172 being utilized. In an embodiment, host computer processor 160 is implemented as computer software executing on a computer system, such as computer system/server 512 as shown in FIG. 5, such that the computer system executes a run command from a central processing unit (CPU) of each of available GPUs 170, 172 to determine a percentage of the each of available GPUs 170, 172 being utilized. In an embodiment, host computer processor 160 is implemented as computer software executing on a computer system, such as processing unit 516 as shown in FIG. 5, such that the computer system executes a run command from a central processing unit (CPU) of each of available GPUs 170, 172 to determine a percentage of the each of available GPUs 170, 172 being utilized. In an embodiment, host computer processor 160 executes a run command from a central processing unit (CPU) of each of available GPUs 170, 172 to determine a percentage of the each of available GPUs 170, 172 being utilized as computer software executing on a processor of host computer processor 160.

Initializing Weight Data

In an exemplary embodiment, the initializing includes setting, by the host computer processor, the weight data in a random manner. In an embodiment, initializing operation 116 includes setting, by the host computer processor, the weight data in a random manner. In an embodiment, host computer processor 160 is configured to set the weight data in a random manner. In an embodiment, host computer processor 160 includes a computer system, such as computer system 500 as shown in FIG. 5, setting the weight data in a random manner. In an embodiment, host computer processor 160 includes a computer system, such as computer system/ server 512 as shown in FIG. 5, setting the weight data in a random manner. In an embodiment, host computer processor 160 includes a computer system, such as processing unit 516 as shown in FIG. 5, setting the weight data in a random manner.

In an embodiment, host computer processor 160 is implemented as computer software executing on a computer system, such as computer system 500 as shown in FIG. 5, such that the computer system sets the weight data in a random manner. In an embodiment, host computer processor 160 is implemented as computer software executing on a computer system, such as computer system/server 512 as shown in FIG. 5, such that the computer system sets the weight data in a random manner. In an embodiment, host computer processor 160 is implemented as computer software executing on a computer system, such as processing unit 516 as shown in FIG. 5, such that the computer system sets the weight data in a random manner. In an embodiment, host computer processor 160 sets the weight data in a random manner as computer software executing on a processor of host computer processor 160.

In an exemplary embodiment, the initializing includes setting, by the host computer processor, the weight data in accordance with input received from a user. In an embodiment, initializing operation 116 includes setting, by the host computer processor, the weight data in accordance with input received from a user. In an embodiment, host computer processor 160 is configured to set the weight data in accordance with input received from a user. In an embodiment, host computer processor 160 includes a computer system, such as computer system 500 as shown in FIG. 5, setting the weight data in accordance with input received from a user. In an embodiment, host computer processor 160 includes a computer system, such as computer system/server 512 as shown in FIG. 5, setting the weight data in accordance with input received from a user. In an embodiment, host computer processor 160 includes a computer system, such as processing unit 516 as shown in FIG. 5, setting the weight data in accordance with input received from a user.

In an embodiment, host computer processor 160 is implemented as computer software executing on a computer system, such as computer system 500 as shown in FIG. 5, such that the computer system sets the weight data in accordance with input received from a user. In an embodiment, host computer processor 160 is implemented as computer software executing on a computer system, such as computer system/server 512 as shown in FIG. 5, such that the computer system sets the weight data in accordance with input received from a user. In an embodiment, host computer processor 160 is implemented as computer software executing on a computer system, such as processing unit 516 as shown in FIG. 5, such that the computer system sets the weight data in accordance with input received from a user. In an embodiment, host computer processor 160 sets the weight data in accordance with input received from a user, as computer software executing on a processor of host computer processor 160.

Forming the Initial Set of GPUs into the Initial Binary Tree Architecture

In an exemplary embodiment, the forming the initial set of GPUs into the initial binary tree architecture includes logically connecting, by the host computer processor, a first GPU among the initially idle GPUs as a leaf node (i.e., child node) to a second GPU among the initially idle GPUs as a parent node if a fast communication link exists between the first GPU and the second GPU. In an embodiment, forming the initial set of GPUs into the initial binary tree architecture operation 120 includes logically connecting, by the host computer processor, a first GPU among the initially idle GPUs as a leaf node (i.e., child node) to a second GPU among the initially idle GPUs as a parent node if a fast communication link exists between the first GPU and the second GPU. In an embodiment, host computer processor 160 is configured to connect logically a first GPU among initially idle GPUs 174, 176 as a leaf node (i.e., child node) to a second GPU among initially idle GPUs 174, 176 as a parent node if a fast communication link exists between the first GPU and the second GPU.

In an embodiment, host computer processor 160 includes a computer system, such as computer system 500 as shown in FIG. 5, logically connecting a first GPU among initially idle GPUs 174, 176 as a leaf node (i.e., child node) to a second GPU among initially idle GPUs 174, 176 as a parent node if a fast communication link exists between the first GPU and the second GPU. In an embodiment, host computer processor 160 includes a computer system, such as computer system/server 512 as shown in FIG. 5, logically connecting a first GPU among initially idle GPUs 174, 176 as a leaf node (i.e., child node) to a second GPU among initially idle GPUs 174, 176 as a parent node if a fast communication link exists between the first GPU and the second GPU. In an embodiment, host computer processor 160 includes a computer system, such as processing unit 516 as shown in FIG. 5, logically connecting a first GPU among initially idle GPUs 174, 176 as a leaf node (i.e., child node) to a second GPU among initially idle GPUs 174, 176 as a parent node if a fast communication link exists between the first GPU and the second GPU.

In an embodiment, host computer processor 160 is implemented as computer software executing on a computer system, such as computer system 500 as shown in FIG. 5, such that the computer system logically connects a first GPU among initially idle GPUs 174, 176 as a leaf node (i.e., child node) to a second GPU among initially idle GPUs 174, 176 as a parent node if a fast communication link exists between the first GPU and the second GPU. In an embodiment, host computer processor 160 is implemented as computer software executing on a computer system, such as computer system/server 512 as shown in FIG. 5, such that the computer system logically connects a first GPU among initially idle GPUs 174, 176 as a leaf node (i.e., child node) to a second GPU among initially idle GPUs 174, 176 as a parent node if a fast communication link exists between the first GPU and the second GPU. In an embodiment, host computer processor 160 is implemented as computer software executing on a computer system, such as processing unit 516 as shown in FIG. 5, such that the computer system logically connects a first GPU among initially idle GPUs 174, 176 as a leaf node (i.e., child node) to a second GPU among initially idle GPUs 174, 176 as a parent node if a fast communication link exists between the first GPU and the second GPU. In an embodiment, host computer processor 160 logically connects a first GPU among initially idle GPUs 174, 176 as a leaf node (i.e., child node) to a second GPU among initially idle GPUs 174, 176 as a parent node if a fast communication link exists between the first GPU and the second GPU as computer software executing on a processor of host computer processor 160. In a specific embodiment, the fast communication link includes a peer-to-peer connection.

Calculating Initial Gradients and Initial Adjusted Weight Data

Figure 2:
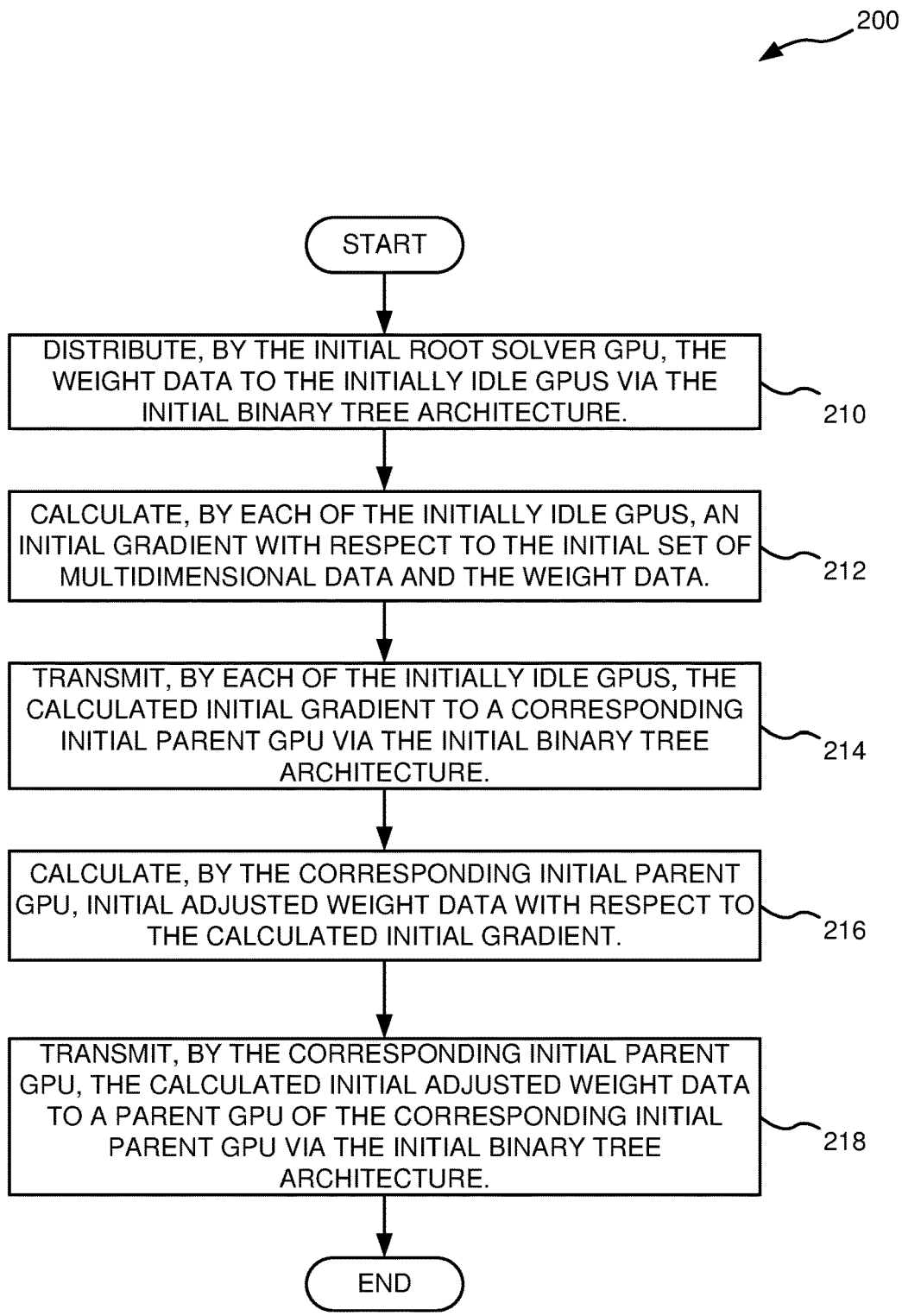
FIG. 2 depicts a flowchart in accordance with an exemplary embodiment of the present invention.

In an exemplary embodiment, the calculating the initial gradients and the set of initial adjusted weight data with respect to the weight data and the initial set of multidimensional data via the initial binary tree architecture includes (a) distributing, by the initial root solver GPU, the weight data to the initially idle GPUs within the initial set of GPUs via the initial binary tree architecture, (b) calculating, by each of the initially idle GPUs within the initial set of GPUs, an initial gradient with respect to the initial set of multidimensional data and the weight data, (c) transmitting, by each of the initially idle GPUs within the initial set of GPUs, the calculated initial gradient to a corresponding initial parent GPU within the initial set of GPUs via the initial binary tree architecture, (d) calculating, by the corresponding initial parent GPU, initial adjusted weight data with respect to the calculated initial gradient, and (e) transmitting, by the corresponding initial parent GPU, the calculated initial adjusted weight data to a parent GPU of the corresponding initial parent GPU via the initial binary tree architecture, where the parent GPU is within the initial set of GPUs. Referring to FIG. 2, in an exemplary embodiment, calculating operation 122 includes an operation 210 of distributing, by the initial root solver GPU, the weight data to the initially idle GPUs within the initial set of GPUs via the initial binary tree architecture, an operation 212 of calculating, by each of the initially idle GPUs within the initial set of GPUs, an initial gradient with respect to the initial set of multidimensional data and the weight data, an operation 214 of transmitting, by each of the initially idle GPUs within the initial set of GPUs, the calculated initial gradient to a corresponding initial parent GPU within the initial set of GPUs via the initial binary tree architecture, an operation 216 of calculating, by the corresponding initial parent GPU, initial adjusted weight data with respect to the calculated initial gradient, and an operation 218 of transmitting, by the corresponding initial parent GPU, the calculated initial adjusted weight data to a parent GPU of the corresponding initial parent GPU via the initial binary tree architecture, where the parent GPU is within the initial set of GPUs.

In an embodiment, initial root solver GPU 162 is configured to distribute the weight data to initially idle GPUs 174, 176 within initial set of GPUs 164 via the initial binary tree architecture. In an embodiment, initial root solver GPU 162 includes a computer system, such as computer system 500 as shown in FIG. 5, distributing the weight data to initially idle GPUs 174, 176 within initial set of GPUs 164 via the initial binary tree architecture. In an embodiment, initial root solver GPU 162 includes a computer system, such as computer system/server 512 as shown in FIG. 5, distributing the weight data to initially idle GPUs 174, 176 within initial set of GPUs 164 via the initial binary tree architecture. In an embodiment, initial root solver GPU 162 includes a computer system, such as processing unit 516 as shown in FIG. 5, distributing the weight data to initially idle GPUs 174, 176 within initial set of GPUs 164 via the initial binary tree architecture. In an embodiment, initial root solver GPU 162 includes a computer system, such as a graphic processor unit/graphics processing unit/visual processing unit, distributing the weight data to initially idle GPUs 174, 176 within initial set of GPUs 164 via the initial binary tree architecture.

In an embodiment, initial root solver GPU 162 is implemented as computer software executing on a computer system, such as computer system 500 as shown in FIG. 5, such that the computer system distributes the weight data to initially idle GPUs 174, 176 within initial set of GPUs 164 via the initial binary tree architecture. In an embodiment, initial root solver GPU 162 is implemented as computer software executing on a computer system, such as computer system/server 512 as shown in FIG. 5, such that the computer system distributes the weight data to initially idle GPUs 174, 176 within initial set of GPUs 164 via the initial binary tree architecture. In an embodiment, initial root solver GPU 162 is implemented as computer software executing on a computer system, such as processing unit 516 as shown in FIG. 5, such that the computer system distributes the weight data to initially idle GPUs 174, 176 within initial set of GPUs 164 via the initial binary tree architecture. In an embodiment, initial root solver GPU 162 is implemented as computer software executing on a computer system, such as a graphic processor unit/graphics processing unit/visual processing unit, such that the computer system distributes the weight data to initially idle GPUs 174, 176 within initial set of GPUs 164 via the initial binary tree architecture. In an embodiment, initial root solver GPU 162 distributes the weight data to initially idle GPUs 174, 176 within initial set of GPUs 164 via the initial binary tree architecture as computer software executing on a processor of initial root solver GPU 162.

In an embodiment, each of initially idle GPUs 174, 176 within initial set of GPUs 164 is configured to calculate an initial gradient with respect to the initial set of multidimensional data and the weight data. In an embodiment, each of initially idle GPUs 174, 176 within initial set of GPUs 164 includes a computer system, such as computer system 500 as shown in FIG. 5, calculating an initial gradient with respect to the initial set of multidimensional data and the weight data. In an embodiment, each of initially idle GPUs 174, 176 within initial set of GPUs 164 includes a computer system, such as computer system/server 512 as shown in FIG. 5, calculating an initial gradient with respect to the initial set of multidimensional data and the weight data. In an embodiment, each of initially idle GPUs 174, 176 within initial set of GPUs 164 includes a computer system, such as processing unit 516 as shown in FIG. 5, calculating an initial gradient with respect to the initial set of multidimensional data and the weight data. In an embodiment, each of initially idle GPUs 174, 176 within initial set of GPUs 164 includes a computer system, such as a graphic processor unit/graphics processing unit/visual processing unit, calculating an initial gradient with respect to the initial set of multidimensional data and the weight data.

In an embodiment, each of initially idle GPUs 174, 176 within initial set of GPUs 164 is implemented as computer software executing on a computer system, such as computer system 500 as shown in FIG. 5, such that the computer system calculates an initial gradient with respect to the initial set of multidimensional data and the weight data. In an embodiment, each of initially idle GPUs 174, 176 within initial set of GPUs 164 is implemented as computer software executing on a computer system, such as computer system/server 512 as shown in FIG. 5, such that the computer system calculates an initial gradient with respect to the initial set of multidimensional data and the weight data. In an embodiment, each of initially idle GPUs 174, 176 within initial set of GPUs 164 is implemented as computer software executing on a computer system, such as processing unit 516 as shown in FIG. 5, such that the computer system calculates an initial gradient with respect to the initial set of multidimensional data and the weight data. In an embodiment, each of initially idle GPUs 174, 176 within initial set of GPUs 164 is implemented as computer software executing on a computer system, such as a graphic processor unit/graphics processing unit/visual processing unit, such that the computer system calculates an initial gradient with respect to the initial set of multidimensional data and the weight data. In an embodiment, each of initially idle GPUs 174, 176 within initial set of GPUs 164 calculates an initial gradient with respect to the initial set of multidimensional data and the weight data as computer software executing on a processor of each of initially idle GPUs 174, 176 within initial set of GPUs 164.

In an embodiment, each of initially idle GPUs 174, 176 within initial set of GPUs 164 is configured to transmit the calculated initial gradient to a corresponding initial parent GPU within initial set of GPUs 164 via the initial binary tree architecture. In an embodiment, each of initially idle GPUs 174, 176 within initial set of GPUs 164 includes a computer system, such as computer system 500 as shown in FIG. 5, transmitting the calculated initial gradient to a corresponding initial parent GPU within initial set of GPUs 164 via the initial binary tree architecture. In an embodiment, each of initially idle GPUs 174, 176 within initial set of GPUs 164 includes a computer system, such as computer system/server 512 as shown in FIG. 5, transmitting the calculated initial gradient to a corresponding initial parent GPU within initial set of GPUs 164 via the initial binary tree architecture. In an embodiment, each of initially idle GPUs 174, 176 within initial set of GPUs 164 includes a computer system, such as processing unit 516 as shown in FIG. 5, transmitting the calculated initial gradient to a corresponding initial parent GPU within initial set of GPUs 164 via the initial binary tree architecture. In an embodiment, each of initially idle GPUs 174, 176 within initial set of GPUs 164 includes a computer system, such as a graphic processor unit/graphics processing unit/visual processing unit, transmitting the calculated initial gradient to a corresponding initial parent GPU within initial set of GPUs 164 via the initial binary tree architecture.

In an embodiment, each of initially idle GPUs 174, 176 within initial set of GPUs 164 is implemented as computer software executing on a computer system, such as computer system 500 as shown in FIG. 5, such that the computer system transmits the calculated initial gradient to a corresponding initial parent GPU within initial set of GPUs 164 via the initial binary tree architecture. In an embodiment, each of initially idle GPUs 174, 176 within initial set of GPUs 164 is implemented as computer software executing on a computer system, such as computer system/server 512 as shown in FIG. 5, such that the computer system transmits the calculated initial gradient to a corresponding initial parent GPU within initial set of GPUs 164 via the initial binary tree architecture. In an embodiment, each of initially idle GPUs 174, 176 within initial set of GPUs 164 is implemented as computer software executing on a computer system, such as processing unit 516 as shown in FIG. 5, such that the computer system transmits the calculated initial gradient to a corresponding initial parent GPU within initial set of GPUs 164 via the initial binary tree architecture. In an embodiment, each of initially idle GPUs 174, 176 within initial set of GPUs 164 is implemented as computer software executing on a computer system, such as a graphic processor unit/graphics processing unit/visual processing unit, such that the computer system transmits the calculated initial gradient to a corresponding initial parent GPU within initial set of GPUs 164 via the initial binary tree architecture. In an embodiment, each of initially idle GPUs 174, 176 within initial set of GPUs 164 transmits the calculated initial gradient to a corresponding initial parent GPU within initial set of GPUs 164 via the initial binary tree architecture as computer software executing on a processor of each of initially idle GPUs 174, 176 within initial set of GPUs 164.

In an embodiment, the corresponding initial parent GPU is configured to calculate initial adjusted weight data with respect to the calculated initial gradient. In an embodiment, the corresponding initial parent GPU includes a computer system, such as computer system 500 as shown in FIG. 5, calculating initial adjusted weight data with respect to the calculated initial gradient. In an embodiment, the corresponding initial parent GPU includes a computer system, such as computer system/server 512 as shown in FIG. 5, calculating initial adjusted weight data with respect to the calculated initial gradient. In an embodiment, the corresponding initial parent GPU includes a computer system, such as processing unit 516 as shown in FIG. 5, calculating initial adjusted weight data with respect to the calculated initial gradient. In an embodiment, the corresponding initial parent GPU includes a computer system, such as a graphic processor unit/graphics processing unit/visual processing unit, calculating initial adjusted weight data with respect to the calculated initial gradient.

In an embodiment, the corresponding initial parent GPU is implemented as computer software executing on a computer system, such as computer system 500 as shown in FIG. 5, such that the computer system calculates initial adjusted weight data with respect to the calculated initial gradient. In an embodiment, the corresponding initial parent GPU is implemented as computer software executing on a computer system, such as computer system/server 512 as shown in FIG. 5, such that the computer system calculates initial adjusted weight data with respect to the calculated initial gradient. In an embodiment, the corresponding initial parent GPU is implemented as computer software executing on a computer system, such as processing unit 516 as shown in FIG. 5, such that the computer system calculates initial adjusted weight data with respect to the calculated initial gradient. In an embodiment, the corresponding initial parent GPU is implemented as computer software executing on a computer system, such as a graphic processor unit/graphics processing unit/visual processing unit, such that the computer system calculates initial adjusted weight data with respect to the calculated initial gradient. In an embodiment, the corresponding initial parent GPU calculates initial adjusted weight data with respect to the calculated initial gradient as computer software executing on a processor of the corresponding initial parent GPU.

In an embodiment, the corresponding initial parent GPU is configured to transmit the calculated initial adjusted weight data to a parent GPU of the corresponding initial parent GPU via the initial binary tree architecture, where the parent GPU is within initial set of GPUs 164. In an embodiment, the corresponding initial parent GPU includes a computer system, such as computer system 500 as shown in FIG. 5, transmitting the calculated initial adjusted weight data to a parent GPU of the corresponding initial parent GPU via the initial binary tree architecture, where the parent GPU is within initial set of GPUs 164. In an embodiment, the corresponding initial parent GPU includes a computer system, such as computer system/server 512 as shown in FIG. 5, transmitting the calculated initial adjusted weight data to a parent GPU of the corresponding initial parent GPU via the initial binary tree architecture, where the parent GPU is within initial set of GPUs 164. In an embodiment, the corresponding initial parent GPU includes a computer system, such as processing unit 516 as shown in FIG. 5, transmitting the calculated initial adjusted weight data to a parent GPU of the corresponding initial parent GPU via the initial binary tree architecture, where the parent GPU is within initial set of GPUs 164. In an embodiment, the corresponding initial parent GPU includes a computer system, such as a graphic processor unit/graphics processing unit/visual processing unit, transmitting the calculated initial adjusted weight data to a parent GPU of the corresponding initial parent GPU via the initial binary tree architecture, where the parent GPU is within initial set of GPUs 164.

In an embodiment, the corresponding initial parent GPU is implemented as computer software executing on a computer system, such as computer system 500 as shown in FIG. 5, such that the computer system transmits the calculated initial adjusted weight data to a parent GPU of the corresponding initial parent GPU via the initial binary tree architecture, where the parent GPU is within initial set of GPUs 164. In an embodiment, the corresponding initial parent GPU is implemented as computer software executing on a computer system, such as computer system/server 512 as shown in FIG. 5, such that the computer system transmits the calculated initial adjusted weight data to a parent GPU of the corresponding initial parent GPU via the initial binary tree architecture, where the parent GPU is within initial set of GPUs 164. In an embodiment, the corresponding initial parent GPU is implemented as computer software executing on a computer system, such as processing unit 516 as shown in FIG. 5, such that the computer system transmits the calculated initial adjusted weight data to a parent GPU of the corresponding initial parent GPU via the initial binary tree architecture, where the parent GPU is within initial set of GPUs 164. In an embodiment, the corresponding initial parent GPU is implemented as computer software executing on a computer system, such as a graphic processor unit/ graphics processing unit/visual processing unit, such that the computer system transmits the calculated initial adjusted weight data to a parent GPU of the corresponding initial parent GPU via the initial binary tree architecture, where the parent GPU is within initial set of GPUs 164. In an embodiment, the corresponding initial parent GPU transmits the calculated initial adjusted weight data to a parent GPU of the corresponding initial parent GPU via the initial binary tree architecture, where the parent GPU is within initial set of GPUs 164 as computer software executing on a processor of the corresponding initial parent GPU.

Identifying a First GPU Among the Available GPUs to Become Idle

In an exemplary embodiment, the identifying a first GPU among the available GPUs to become idle includes executing, by the host computer processor, a run command from a central processing unit (CPU) of each of the available GPUs to determine a percentage of the each of the available GPUs being utilized. In an embodiment, identifying a first GPU among the available GPUs to become idle operation 130 includes executing, by the host computer processor, a run command from a central processing unit (CPU) of each of the available GPUs to determine a percentage of the each of the available GPUs being utilized. In an embodiment, host computer processor 160 is configured to execute a run command from a central processing unit (CPU) of each of available GPUs 170, 172 to determine a percentage of the each of available GPUs 170, 172 being utilized. In an embodiment, host computer processor 160 includes a computer system, such as computer system 500 as shown in FIG. 5, executing a run command from a central processing unit (CPU) of each of available GPUs 170, 172 to determine a percentage of the each of available GPUs 170, 172 being utilized. In an embodiment, host computer processor 160 includes a computer system, such as computer system/server 512 as shown in FIG. 5, executing a run command from a central processing unit (CPU) of each of available GPUs 170, 172 to determine a percentage of the each of available GPUs 170, 172 being utilized. In an embodiment, host computer processor 160 includes a computer system, such as processing unit 516 as shown in FIG. 5, executing a run command from a central processing unit (CPU) of each of available GPUs 170, 172 to determine a percentage of the each of available GPUs 170, 172 being utilized.

In an embodiment, host computer processor 160 is implemented as computer software executing on a computer system, such as computer system 500 as shown in FIG. 5, such that the computer system executes a run command from a central processing unit (CPU) of each of available GPUs 170, 172 to determine a percentage of the each of available GPUs 170, 172 being utilized. In an embodiment, host computer processor 160 is implemented as computer software executing on a computer system, such as computer system/server 512 as shown in FIG. 5, such that the computer system executes a run command from a central processing unit (CPU) of each of available GPUs 170, 172 to determine a percentage of the each of available GPUs 170, 172 being utilized. In an embodiment, host computer processor 160 is implemented as computer software executing on a computer system, such as processing unit 516 as shown in FIG. 5, such that the computer system executes a run command from a central processing unit (CPU) of each of available GPUs 170, 172 to determine a percentage of the each of available GPUs 170, 172 being utilized. In an embodiment, host computer processor 160 executes a run command from a central processing unit (CPU) of each of available GPUs 170, 172 to determine a percentage of the each of available GPUs 170, 172 being utilized as computer software executing on a processor of host computer processor 160.

Identifying Additional GPUs that are Currently Idle Among the Available GPUs

In an exemplary embodiment, the identifying additional GPUs that are currently idle among the available GPUs includes executing, by the host computer processor, a run command from a central processing unit (CPU) of each of the available GPUs to determine a percentage of the each of the available GPUs being utilized. In an embodiment, identifying additional GPUs that are currently idle among the available GPUs operation 136 includes executing, by the host computer processor, a run command from a central processing unit (CPU) of each of the available GPUs to determine a percentage of the each of the available GPUs being utilized. In an embodiment, host computer processor 160 is configured to execute a run command from a central processing unit (CPU) of each of available GPUs 170, 172 to determine a percentage of the each of available GPUs 170, 172 being utilized. In an embodiment, host computer processor 160 includes a computer system, such as computer system 500 as shown in FIG. 5, executing a run command from a central processing unit (CPU) of each of available GPUs 170, 172 to determine a percentage of the each of available GPUs 170, 172 being utilized. In an embodiment, host computer processor 160 includes a computer system, such as computer system/server 512 as shown in FIG. 5, executing a run command from a central processing unit (CPU) of each of available GPUs 170, 172 to determine a percentage of the each of available GPUs 170, 172 being utilized. In an embodiment, host computer processor 160 includes a computer system, such as processing unit 516 as shown in FIG. 5, executing a run command from a central processing unit (CPU) of each of available GPUs 170, 172 to determine a percentage of the each of available GPUs 170, 172 being utilized.

In an embodiment, host computer processor 160 is implemented as computer software executing on a computer system, such as computer system 500 as shown in FIG. 5, such that the computer system executes a run command from a central processing unit (CPU) of each of available GPUs 170, 172 to determine a percentage of the each of available GPUs 170, 172 being utilized. In an embodiment, host computer processor 160 is implemented as computer software executing on a computer system, such as computer system/server 512 as shown in FIG. 5, such that the computer system executes a run command from a central processing unit (CPU) of each of available GPUs 170, 172 to determine a percentage of the each of available GPUs 170, 172 being utilized. In an embodiment, host computer processor 160 is implemented as computer software executing on a computer system, such as processing unit 516 as shown in FIG. 5, such that the computer system executes a run command from a central processing unit (CPU) of each of available GPUs 170, 172 to determine a percentage of the each of available GPUs 170, 172 being utilized. In an embodiment, host computer processor 160 executes a run command from a central processing unit (CPU) of each of available GPUs 170, 172 to determine a percentage of the each of available GPUs 170, 172 being utilized as computer software executing on a processor of host computer processor 160.

Calculating Current Gradients and Current Adjusted Weight Data

Figure 3:
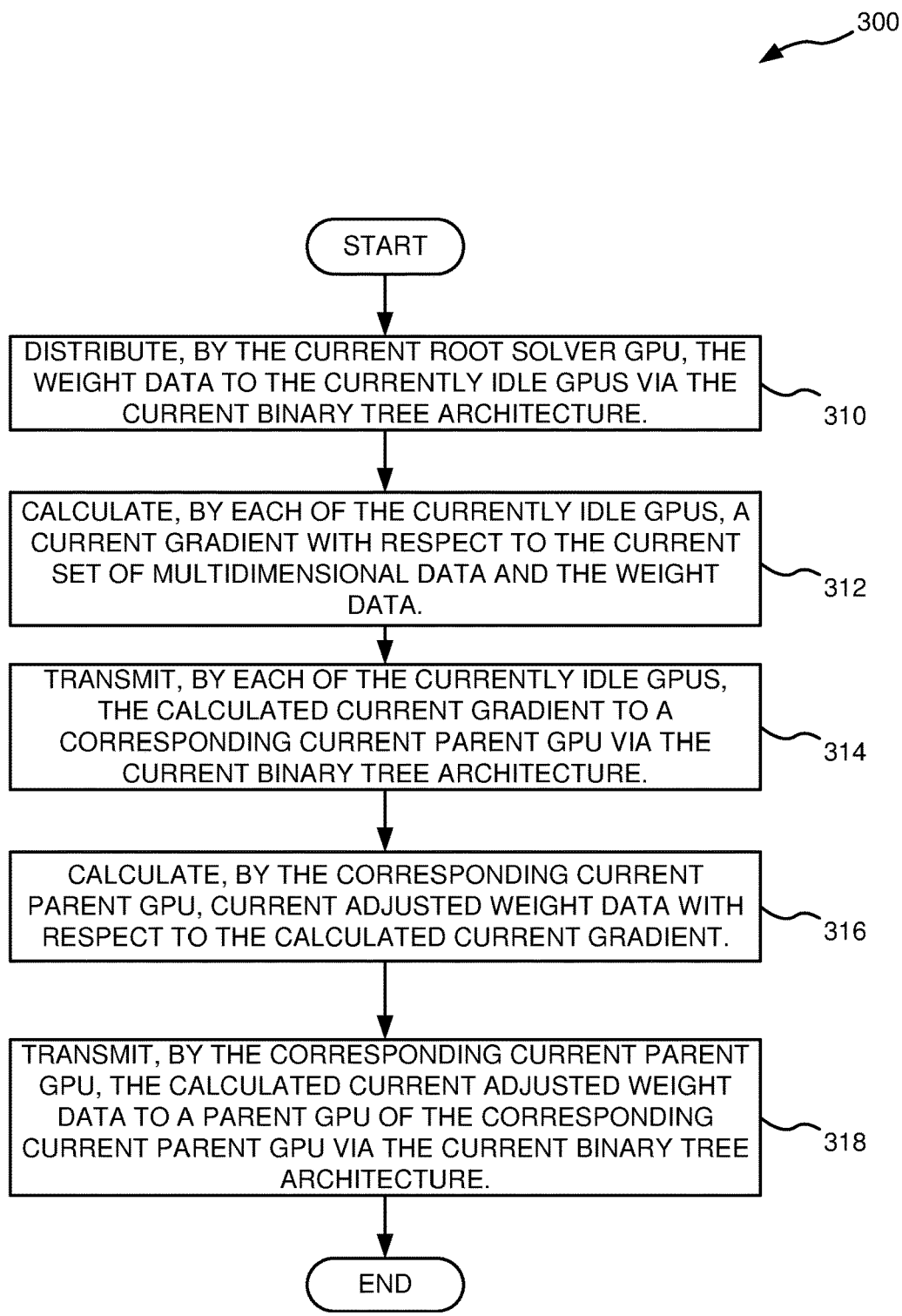
FIG. 3 depicts a flowchart in accordance with an exemplary embodiment of the present invention.

In an exemplary embodiment, the calculating the current gradients and the set of current adjusted weight data with respect to the weight data and the current set of multidimensional data via the current binary tree architecture includes (a) distributing, by the current root solver GPU, the weight data to the additional currently idle GPUs within the current set of GPUs via the current binary tree architecture, (b) calculating, by each of the additional currently idle GPUs within the current set of GPUs, a current gradient with respect to the current set of multidimensional data and the weight data, (c) transmitting, by each of the additional currently idle GPUs within the current set of GPUs, the calculated current gradient to a corresponding current parent GPU within the current set of GPUs via the current binary tree architecture, (d) calculating, by the corresponding current parent GPU, current adjusted weight data with respect to the calculated current gradient, and (e) transmitting, by the corresponding current parent GPU, the calculated current adjusted weight data to a parent GPU of the corresponding current parent GPU via the current binary tree architecture, where the parent GPU is within the current set of GPUs. Referring to FIG. 3, in an exemplary embodiment, calculating operation 142 includes an operation 310 of distributing, by the current root solver GPU, the weight data to the additional currently idle GPUs within the current set of GPUs via the current binary tree architecture, an operation 310 of calculating, by each of the additional currently idle GPUs within the current set of GPUs, a current gradient with respect to the current set of multidimensional data and the weight data, an operation 310 of transmitting, by each of the additional currently idle GPUs within the current set of GPUs, the calculated current gradient to a corresponding current parent GPU within the current set of GPUs via the current binary tree architecture, an operation 310 of calculating, by the corresponding current parent GPU, current adjusted weight data with respect to the calculated current gradient, and an operation 310 of transmitting, by the corresponding current parent GPU, the calculated current adjusted weight data to a parent GPU of the corresponding current parent GPU via the current binary tree architecture, where the parent GPU is within the current set of GPUs.

In an embodiment, current root solver GPU 166 is configured to distribute the weight data to additional currently idle GPUs 180, 182 within current set of GPUs 168 via the current binary tree architecture. In an embodiment, current root solver GPU 166 includes a computer system, such as computer system 500 as shown in FIG. 5, distributing the weight data to additional currently idle GPUs 180, 182 within current set of GPUs 168 via the current binary tree architecture. In an embodiment, current root solver GPU 166 includes a computer system, such as computer system/server 512 as shown in FIG. 5, distributing the weight data to additional currently idle GPUs 180, 182 within current set of GPUs 168 via the current binary tree architecture. In an embodiment, current root solver GPU 166 includes a computer system, such as processing unit 516 as shown in FIG. 5, distributing the weight data to additional currently idle GPUs 180, 182 within current set of GPUs 168 via the current binary tree architecture. In an embodiment, current root solver GPU 166 includes a computer system, such as a graphic processor unit/graphics processing unit/visual processing unit, distributing the weight data to additional currently idle GPUs 180, 182 within current set of GPUs 168 via the current binary tree architecture.

In an embodiment, current root solver GPU 166 is implemented as computer software executing on a computer system, such as computer system 500 as shown in FIG. 5, such that the computer system distributes the weight data to additional currently idle GPUs 180, 182 within current set of GPUs 168 via the current binary tree architecture. In an embodiment, current root solver GPU 166 is implemented as computer software executing on a computer system, such as computer system/server 512 as shown in FIG. 5, such that the computer system distributes the weight data to additional currently idle GPUs 180, 182 within current set of GPUs 168 via the current binary tree architecture. In an embodiment, current root solver GPU 166 is implemented as computer software executing on a computer system, such as processing unit 516 as shown in FIG. 5, such that the computer system distributes the weight data to additional currently idle GPUs 180, 182 within current set of GPUs 168 via the current binary tree architecture. In an embodiment, current root solver GPU 166 is implemented as computer software executing on a computer system, such as a graphic processor unit/graphics processing unit/visual processing unit, such that the computer system distributes the weight data to additional currently idle GPUs 180, 182 within current set of GPUs 168 via the current binary tree architecture. In an embodiment, current root solver GPU 166 distributes the weight data to additional currently idle GPUs 180, 182 within current set of GPUs 168 via the current binary tree architecture as computer software executing on a processor of initial root solver GPU 162.

In an embodiment, each of additional currently idle GPUs 180, 182 within current set of GPUs 168 is configured to calculate a current gradient with respect to the current set of multidimensional data and the weight data. In an embodiment, each of additional currently idle GPUs 180, 182 within current set of GPUs 168 includes a computer system, such as computer system 500 as shown in FIG. 5, calculating a current gradient with respect to the current set of multidimensional data and the weight data. In an embodiment, each of additional currently idle GPUs 180, 182 within current set of GPUs 168 includes a computer system, such as computer system/server 512 as shown in FIG. 5, calculating a current gradient with respect to the current set of multidimensional data and the weight data. In an embodiment, each of additional currently idle GPUs 180, 182 within current set of GPUs 168 includes a computer system, such as processing unit 516 as shown in FIG. 5, calculating a current gradient with respect to the current set of multidimensional data and the weight data. In an embodiment, each of additional currently idle GPUs 180, 182 within current set of GPUs 168 includes a computer system, such as a graphic processor unit/graphics processing unit/visual processing unit, calculating a current gradient with respect to the current set of multidimensional data and the weight data.

In an embodiment, each of additional currently idle GPUs 180, 182 within current set of GPUs 168 is implemented as computer software executing on a computer system, such as computer system 500 as shown in FIG. 5, such that the computer system calculates a current gradient with respect to the current set of multidimensional data and the weight data. In an embodiment, each of additional currently idle GPUs 180, 182 within current set of GPUs 168 is implemented as computer software executing on a computer system, such as computer system/server 512 as shown in FIG. 5, such that the computer system calculates a current gradient with respect to the current set of multidimensional data and the weight data. In an embodiment, each of additional currently idle GPUs 180, 182 within current set of GPUs 168 is implemented as computer software executing on a computer system, such as processing unit 516 as shown in FIG. 5, such that the computer system calculates a current gradient with respect to the current set of multidimensional data and the weight data. In an embodiment, each of additional currently idle GPUs 180, 182 within current set of GPUs 168 is implemented as computer software executing on a computer system, such as a graphic processor unit/graphics processing unit/visual processing unit, such that the computer system calculates a current gradient with respect to the current set of multidimensional data and the weight data. In an embodiment, each of additional currently idle GPUs 180, 182 within current set of GPUs 168 calculates a current gradient with respect to the current set of multidimensional data and the weight data as computer software executing on a processor of each of additional currently idle GPUs 180, 182 within current set of GPUs 168.

In an embodiment, each of additional currently idle GPUs 180, 182 within current set of GPUs 168 is configured to transmit the calculated current gradient to a corresponding current parent GPU within initial set of GPUs 168 via the current binary tree architecture. In an embodiment, each of additional currently idle GPUs 180, 182 within current set of GPUs 168 includes a computer system, such as computer system 500 as shown in FIG. 5, transmitting the calculated current gradient to a corresponding current parent GPU within initial set of GPUs 168 via the current binary tree architecture. In an embodiment, each of additional currently idle GPUs 180, 182 within current set of GPUs 168 includes a computer system, such as computer system/server 512 as shown in FIG. 5, transmitting the calculated current gradient to a corresponding current parent GPU within initial set of GPUs 168 via the current binary tree architecture. In an embodiment, each of additional currently idle GPUs 180, 182 within current set of GPUs 168 includes a computer system, such as processing unit 516 as shown in FIG. 5, transmitting the calculated current gradient to a corresponding current parent GPU within initial set of GPUs 168 via the current binary tree architecture. In an embodiment, each of additional currently idle GPUs 180, 182 within current set of GPUs 168 includes a computer system, such as a graphic processor unit/graphics processing unit/visual processing unit, transmitting the calculated current gradient to a corresponding current parent GPU within initial set of GPUs 168 via the current binary tree architecture.

In an embodiment, each of additional currently idle GPUs 180, 182 within current set of GPUs 168 is implemented as computer software executing on a computer system, such as computer system 500 as shown in FIG. 5, such that the computer system transmits the calculated current gradient to a corresponding current parent GPU within initial set of GPUs 168 via the current binary tree architecture. In an embodiment, each of additional currently idle GPUs 180, 182 within current set of GPUs 168 is implemented as computer software executing on a computer system, such as computer system/server 512 as shown in FIG. 5, such that the computer system transmits the calculated current gradient to a corresponding current parent GPU within initial set of GPUs 168 via the current binary tree architecture. In an embodiment, each of additional currently idle GPUs 180, 182 within current set of GPUs 168 is implemented as computer software executing on a computer system, such as processing unit 516 as shown in FIG. 5, such that the computer system transmits the calculated current gradient to a corresponding current parent GPU within initial set of GPUs 168 via the current binary tree architecture. In an embodiment, each of additional currently idle GPUs 180, 182 within current set of GPUs 168 is implemented as computer software executing on a computer system, such as a graphic processor unit/graphics processing unit/visual processing unit, such that the computer system transmits the calculated current gradient to a corresponding current parent GPU within initial set of GPUs 168 via the current binary tree architecture. In an embodiment, each of additional currently idle GPUs 180, 182 within current set of GPUs 168 transmits the calculated current gradient to a corresponding current parent GPU within initial set of GPUs 168 via the current binary tree architecture as computer software executing on a processor of each of additional currently idle GPUs 180, 182 within current set of GPUs 168.

In an embodiment, the corresponding current parent GPU is configured to calculate current adjusted weight data with respect to the calculated current gradient. In an embodiment, the corresponding current parent GPU includes a computer system, such as computer system 500 as shown in FIG. 5, calculating current adjusted weight data with respect to the calculated current gradient. In an embodiment, the corresponding current parent GPU includes a computer system, such as computer system/server 512 as shown in FIG. 5, calculating current adjusted weight data with respect to the calculated current gradient. In an embodiment, the corresponding current parent GPU includes a computer system, such as processing unit 516 as shown in FIG. 5, calculating current adjusted weight data with respect to the calculated current gradient. In an embodiment, the corresponding current parent GPU includes a computer system, such as a graphic processor unit/graphics processing unit/visual processing unit, calculating current adjusted weight data with respect to the calculated current gradient.

In an embodiment, the corresponding current parent GPU is implemented as computer software executing on a computer system, such as computer system 500 as shown in FIG. 5, such that the computer system calculates current adjusted weight data with respect to the calculated current gradient. In an embodiment, the corresponding current parent GPU is implemented as computer software executing on a computer system, such as computer system/server 512 as shown in FIG. 5, such that the computer system calculates current adjusted weight data with respect to the calculated current gradient. In an embodiment, the corresponding current parent GPU is implemented as computer software executing on a computer system, such as processing unit 516 as shown in FIG. 5, such that the computer system calculates current adjusted weight data with respect to the calculated current gradient. In an embodiment, the corresponding current parent GPU is implemented as computer software executing on a computer system, such as a graphic processor unit/graphics processing unit/visual processing unit, such that the computer system calculates current adjusted weight data with respect to the calculated current gradient. In an embodiment, the corresponding current parent GPU calculates current adjusted weight data with respect to the calculated current gradient as computer software executing on a processor of the corresponding current parent GPU.

In an embodiment, the corresponding current parent GPU is configured to transmit the calculated current adjusted weight data to a parent GPU of the corresponding current parent GPU via the current binary tree architecture, where the parent GPU is within current set of GPUs 168. In an embodiment, the corresponding current parent GPU includes a computer system, such as computer system 500 as shown in FIG. 5, transmitting the calculated current adjusted weight data to a parent GPU of the corresponding current parent GPU via the current binary tree architecture, where the parent GPU is within current set of GPUs 168. In an embodiment, the corresponding current parent GPU includes a computer system, such as computer system/server 512 as shown in FIG. 5, transmitting the calculated current adjusted weight data to a parent GPU of the corresponding current parent GPU via the current binary tree architecture, where the parent GPU is within current set of GPUs 168. In an embodiment, the corresponding current parent GPU includes a computer system, such as processing unit 516 as shown in FIG. 5, transmitting the calculated current adjusted weight data to a parent GPU of the corresponding current parent GPU via the current binary tree architecture, where the parent GPU is within current set of GPUs 168. In an embodiment, the corresponding current parent GPU includes a computer system, such as a graphic processor unit/graphics processing unit/visual processing unit, transmitting the calculated current adjusted weight data to a parent GPU of the corresponding current parent GPU via the current binary tree architecture, where the parent GPU is within current set of GPUs 168.

In an embodiment, the corresponding current parent GPU is implemented as computer software executing on a computer system, such as computer system 500 as shown in FIG. 5, such that the computer system transmits the calculated current adjusted weight data to a parent GPU of the corresponding current parent GPU via the current binary tree architecture, where the parent GPU is within current set of GPUs 168. In an embodiment, the corresponding current parent GPU is implemented as computer software executing on a computer system, such as computer system/server 512 as shown in FIG. 5, such that the computer system transmits the calculated current adjusted weight data to a parent GPU of the corresponding current parent GPU via the current binary tree architecture, where the parent GPU is within current set of GPUs 168. In an embodiment, the corresponding current parent GPU is implemented as computer software executing on a computer system, such as processing unit 516 as shown in FIG. 5, such that the computer system transmits the calculated current adjusted weight data to a parent GPU of the corresponding current parent GPU via the current binary tree architecture, where the parent GPU is within current set of GPUs 168. In an embodiment, the corresponding current parent GPU is implemented as computer software executing on a computer system, such as a graphic processor unit/graphics processing unit/visual processing unit, such that the computer system transmits the calculated current adjusted weight data to a parent GPU of the corresponding current parent GPU via the current binary tree architecture, where the parent GPU is within current set of GPUs 168. In an embodiment, the corresponding current parent GPU transmits the calculated current adjusted weight data to a parent GPU of the corresponding current parent GPU via the current binary tree architecture, where the parent GPU is within current set of GPUs 168, where the parent GPU is within current set of GPUs 168 as computer software executing on a processor of the corresponding current parent GPU.

Forming the Current Set of GPUs into the Current Binary Tree Architecture

In an exemplary embodiment, the forming the current set of GPUs into the current binary tree architecture includes logically connecting, by the host computer processor, a first GPU among the additional currently idle GPUs as a leaf node (i.e., child node) to a second GPU among the additional currently idle GPUs and the current root solver GPU as a parent node if a fast communication link exists between the first GPU and the second GPU. In an embodiment, forming the current set of GPUs into the current binary tree architecture operation 140 includes logically connecting, by the host computer processor, a first GPU among the additional currently idle GPUs as a leaf node (i.e., child node) to a second GPU among the additional currently idle GPUs and the current root solver GPU as a parent node if a fast communication link exists between the first GPU and the second GPU. In an embodiment, host computer processor 160 is configured to connect logically a first GPU among additional currently idle GPUs 180, 182 as a leaf node (i.e., child node) to a second GPU among additional currently idle GPUs 180, 182 and current root solver GPU 166 as a parent node if a fast communication link exists between the first GPU and the second GPU. In an embodiment, host computer processor 160 includes a computer system, such as computer system 500 as shown in FIG. 5, logically connecting a first GPU among additional currently idle GPUs 180, 182 as a leaf node (i.e., child node) to a second GPU among additional currently idle GPUs 180, 182 and current root solver GPU 166 as a parent node if a fast communication link exists between the first GPU and the second GPU. In an embodiment, host computer processor 160 includes a computer system, such as computer system/server 512 as shown in FIG. 5, logically connecting a first GPU among additional currently idle GPUs 180, 182 as a leaf node (i.e., child node) to a second GPU among additional currently idle GPUs 180, 182 and current root solver GPU 166 as a parent node if a fast communication link exists between the first GPU and the second GPU. In an embodiment, host computer processor 160 includes a computer system, such as processing unit 516 as shown in FIG. 5, logically connecting a first GPU among additional currently idle GPUs 180, 182 as a leaf node (i.e., child node) to a second GPU among additional currently idle GPUs 180, 182 and current root solver GPU 166 as a parent node if a fast communication link exists between the first GPU and the second GPU.

In an embodiment, host computer processor 160 is implemented as computer software executing on a computer system, such as computer system 500 as shown in FIG. 5, such that the computer system logically connects a first GPU among additional currently idle GPUs 180, 182 as a leaf node (i.e., child node) to a second GPU among additional currently idle GPUs 180, 182 and current root solver GPU 166 as a parent node if a fast communication link exists between the first GPU and the second GPU. In an embodiment, host computer processor 160 is implemented as computer software executing on a computer system, such as computer system/server 512 as shown in FIG. 5, such that the computer system logically connects a first GPU among additional currently idle GPUs 180, 182 as a leaf node (i.e., child node) to a second GPU among additional currently idle GPUs 180, 182 and current root solver GPU 166 as a parent node if a fast communication link exists between the first GPU and the second GPU. In an embodiment, host computer processor 160 is implemented as computer software executing on a computer system, such as processing unit 516 as shown in FIG. 5, such that the computer system logically connects a first GPU among additional currently idle GPUs 180, 182 as a leaf node (i.e., child node) to a second GPU among additional currently idle GPUs 180, 182 and current root solver GPU 166 as a parent node if a fast communication link exists between the first GPU and the second GPU. In an embodiment, host computer processor 160 logically connects a first GPU among additional currently idle GPUs 180, 182 as a leaf node (i.e., child node) to a second GPU among additional currently idle GPUs 180, 182 and current root solver GPU 166 as a parent node if a fast communication link exists between the first GPU and the second GPU as computer software executing on a processor of host computer processor 160. In a specific embodiment, the fast communication link includes a peer-to-peer connection.

Example

Figure 4A:
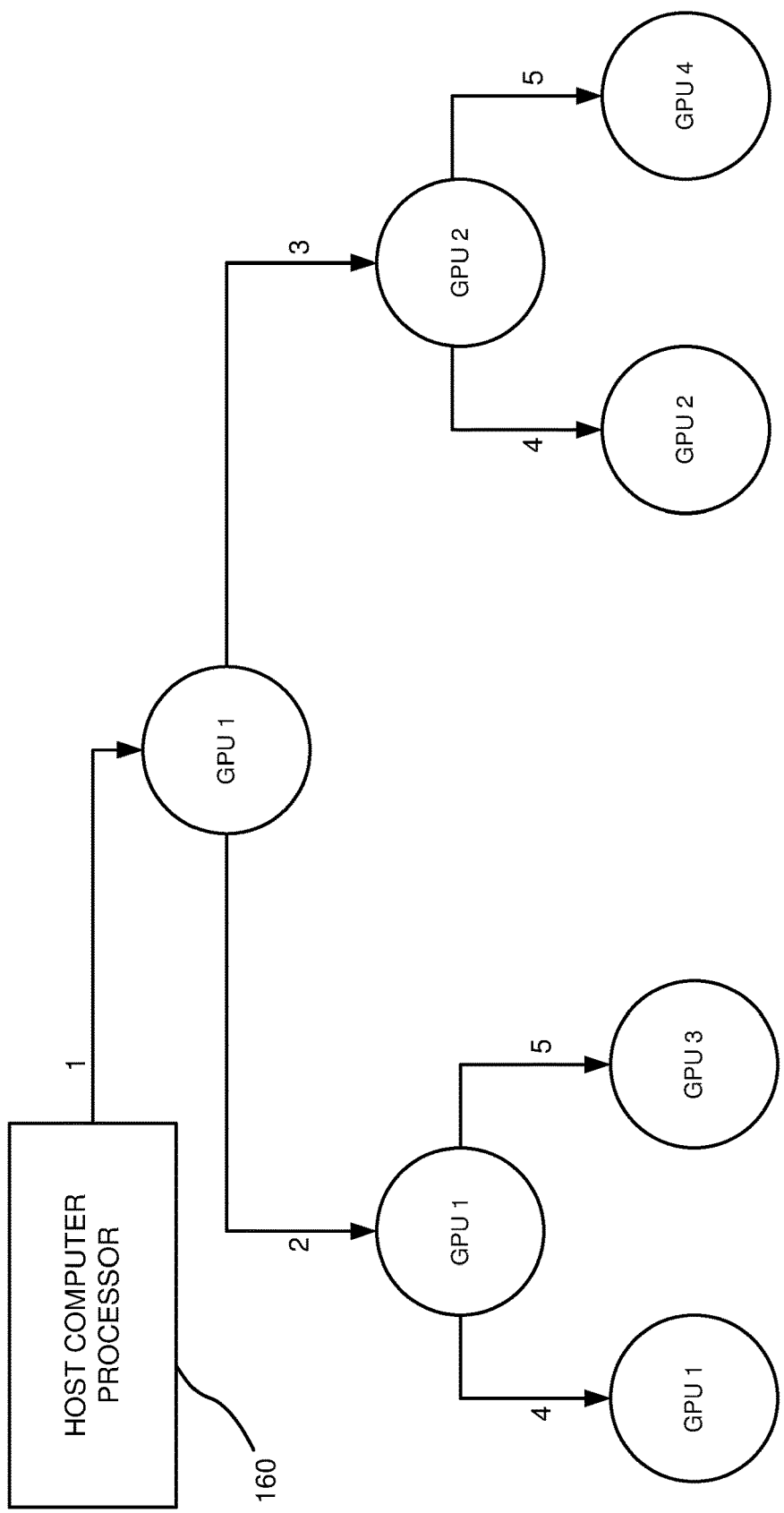
FIG. 4A depicts a state diagram in accordance with an exemplary embodiment of the present invention.
Figure 4B:
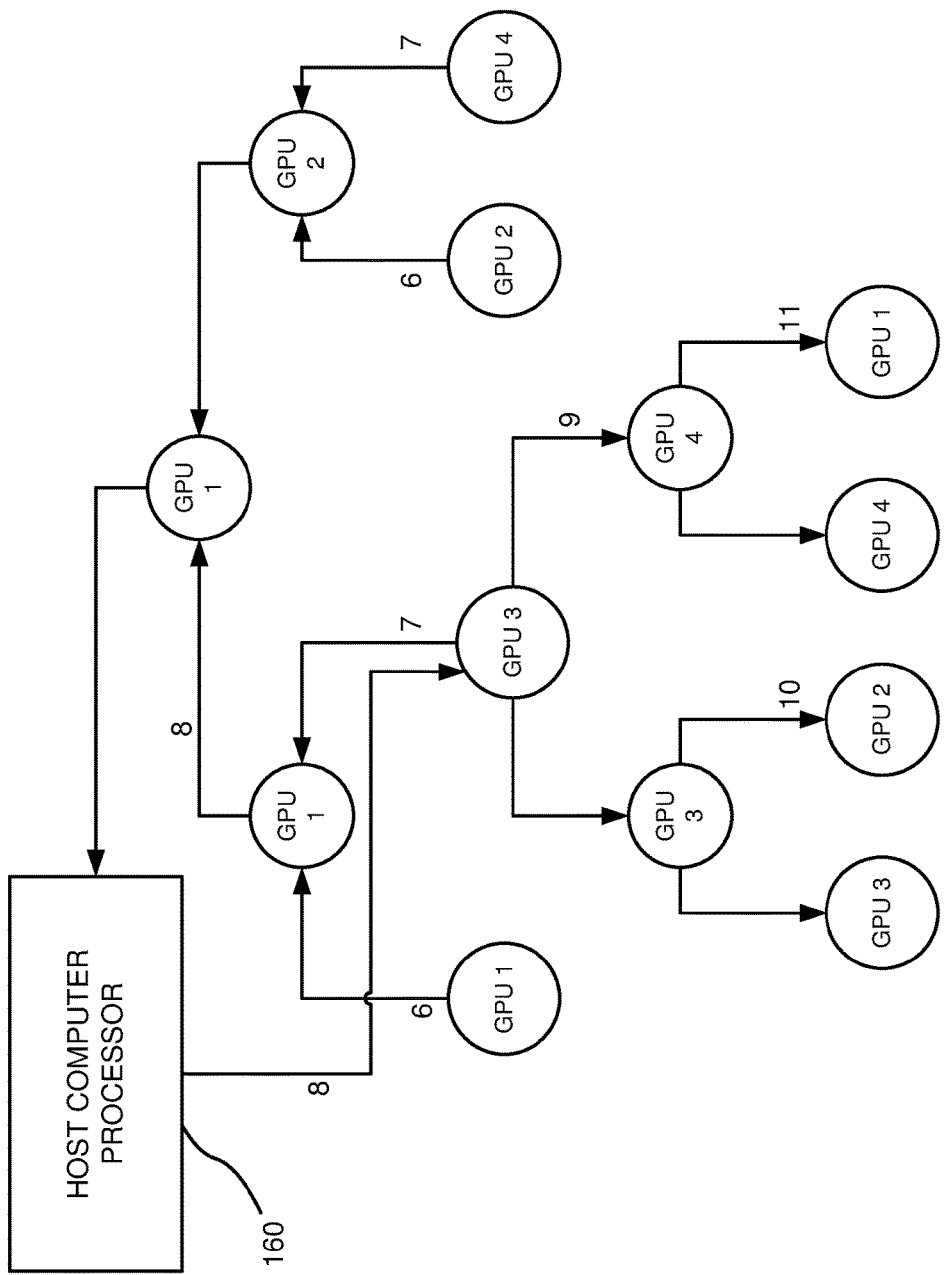
FIG. 4B depicts a state diagram in accordance with an exemplary embodiment of the present invention.

Referring to FIG. 4A, for example, during a forward pass, host computer processor (i.e., host) pushes the mini batch/set of multidimensional data in step 1 to one of the GPUs, GPU 1 (called the root solver) (i.e., initial root solver GPU 162), which further breaks down the problem and passes the problem at steps 2, 3, 4, and 5 to the other participating GPUs, GPU2, GPU 3, and GPU 4 (e.g., initially idle GPUs 174, 176), in a binary tree format. Referring to FIG. 4B, for example, during the backward pass, each of the GPUs, GPU 1, GPU 2, GPU 3, and GPU 4 compute their respective gradients (initial gradients) and transfer, at steps 6 and 7, them to the parent GPU, GPU 1 and GPU 2, which computes the weights and does the adjustment, all the way back to the root solver, GPU 1 (i.e., initial root solver GPU 162), such that once the GPUs, GPU 1, GPU 2, GPU 3, and GPU 4 have passed on their data to the parent GPU, GPU 1 and GPU 2, the GPUs, GPU 1, GPU 2, GPU 3, and GPU 4 enter an idle state.

Further referring to FIG. 4B, for example, at step 7, when GPU 3 gets free/becomes idle, host computer processor 160 (i.e., host) chooses GPU 3 as the root solver (e.g., current root solver 166) and initiates the next iteration, and GPU 3 (e.g., current root solver 166) receives the dataset/current set of multidimensional data at step 8 from host computer processor 160. If during this course of time, GPU 4 were to become free/idle (e.g., additional currently idle GPU 180, 182), GPU 4 would participate in the forward pass of this iteration of deep learning (e.g., current iteration of deep learning) such that GPU 3 (e.g., current root solver 166) shares data with GPU 4 at step 9. Subsequently, the other GPUs, GPU 2 and GPU 1 (e.g., additional currently idle GPU 180, 182) would join this newly formed binary tree (e.g., current binary tree architecture) with GPU 3 as the root solver (e.g., current root solver 166) and participate in the forward pass of this iteration of deep learning at steps 10 and 11. For example, the wait time of GPUs after they are done with their gradient calculation could be zero. During subsequent iterations, for example, the host/host computer processor (e.g., host computer processor 160) chooses new root solvers dynamically with no single GPU waiting until the complete pass by the root solvers are computed. For example, the present invention could increase the performance efficiency of training deep learning networks in a highly scalable GPU environment.

Computer System

In an exemplary embodiment, the computer system is a computer system 500 as shown in FIG. 5. Computer system 500 is only one example of a computer system and is not intended to suggest any limitation as to the scope of use or functionality of embodiments of the present invention. Regardless, computer system 500 is capable of being implemented to perform and/or performing any of the functionality/operations of the present invention.

Computer system 500 includes a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 512 may be described in the general context of computer system-executable instructions, such as program modules, being executed by a computer system. Generally, program modules may include routines, programs, objects, components, logic, and/or data structures that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in computer system 500 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 512 typically includes a variety of computer system readable media. Such media may be any available media that is accessible by computer system/server 512, and includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions/operations of embodiments of the invention.

Program/utility 540, having a set (at least one) of program modules 542, may be stored in memory 528 by way of example, and not limitation. Exemplary program modules 542 may include an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the present invention.

Computer system/server 512 may also communicate with one or more external devices 514 such as a keyboard, a pointing device, a display 24, one or more devices that enable a user to interact with computer system/server 512, and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems.

Computer Program Product

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system comprising:
a host computer processor
to identify graphic processor units (GPUs) that are available (available GPUs),
to identify GPUs that are idle (initially idle GPUs) among the available GPUs for an initial iteration of deep learning,
to choose one of the initially idle GPUs as an initial root solver GPU for the initial iteration,
to initialize weight data for an initial set of multidimensional data,
to transmit the initial set of multidimensional data to the available GPUs, and
to form an initial set of GPUs into an initial binary tree architecture, wherein the initial set comprises the initially idle GPUs and the initial root solver GPU, wherein the initial root solver GPU is the root of the initial binary tree architecture;
wherein the initial set of GPUs executes operations to calculate initial gradients and a set of initial adjusted weight data with respect to the weight data and the initial set of multidimensional data via the initial binary tree architecture;
wherein the host computer processor further executes operations, in response to the calculating the initial gradients and the initial adjusted weight data,
to identify a first GPU among the available GPUs to become idle (first currently idle GPU) for a current iteration of deep learning,
to choose the first currently idle GPU as a current root solver GPU for the current iteration,
to transmit a current set of multidimensional data to the current root solver GPU,
in response to the identifying the first currently idle GPU, to identify additional GPUs that are currently idle (additional currently idle GPUs) among the available GPUs,
to transmit the current set of multidimensional data to the additional currently idle GPUs, and
to form a current set of GPUs into a current binary tree architecture, wherein the current set comprises the additional currently idle GPUs and the current root solver GPU, wherein the current root solver GPU is the root of the current binary tree architecture;
wherein the current set of GPUs executes operations to calculate current gradients and a set of current adjusted weight data with respect to at least the weight data and the current set of multidimensional data via the current binary tree architecture;
wherein the initial root solver executes operations, in response to the initial root solver GPU receiving a set of calculated initial adjusted weight data, to transmit an initial update to the weight data to the available GPUs;
wherein the current root solver executes operations, in response to the current root solver GPU receiving a set of current initial adjusted weight data, to transmit a current update to the weight data to the available GPUs; and
wherein the identifying, the choosing, the transmitting, the forming, and the calculating are repeated with respect to the weight data, updates to the weight data, and subsequent sets of multidimensional data.

2. The system of claim 1 wherein to form the initial set of GPUs into the initial binary tree architecture, the host computer processor executes operations to connect logically a first GPU among the initially idle GPUs as a leaf node to a second GPU among the initially idle GPUs as a parent node if a fast communication link exists between the first GPU and the second GPU.

3. The system of claim 1 wherein to calculate the initial gradients and the set of initial adjusted weight data with respect to the weight data and the initial set of multidimensional data via the initial binary tree architecture,
the initial root solver GPU executes operations to distribute the weight data to the initially idle GPUs within the initial set of GPUs via the initial binary tree architecture,
each of the initially idle GPUs within the initial set of GPUs executes operations to
calculate an initial gradient with respect to the initial set of multidimensional data and the weight data, and
transmit the calculated initial gradient to a corresponding initial parent GPU within the initial set of GPUs via the initial binary tree architecture, and
the corresponding initial parent GPU executes operations to
calculate initial adjusted weight data with respect to the calculated initial gradient, and
transmit the calculated initial adjusted weight data to a parent GPU of the corresponding initial parent GPU via the initial binary tree architecture, wherein the parent GPU is within the initial set of GPUs.

4. The system of claim 1 wherein to form the current set of GPUs into the current binary tree architecture, the host computer processor executes operations to connect logically a first GPU among the additional currently idle GPUs as a leaf node to a second GPU among the additional currently idle GPUs and the current root solver GPU as a parent node if a fast communication link exists between the first GPU and the second GPU.

5. The system of claim 1 wherein to calculate the current gradients and the set of current adjusted weight data with respect to at least the weight data and the current set of multidimensional data via the current binary tree architecture, the current root solver GPU executes operations to distribute the weight data to the additional currently idle GPUs within the current set of GPUs via the current binary tree architecture, each of the additional currently idle GPUs within the current set of GPUs executes operations calculate a current gradient with respect to the current set of multidimensional data and the weight data, and transmit the calculated current gradient to a corresponding current parent GPU within the initial set of GPUs via the current binary tree architecture; and the corresponding current parent GPU executes operations to calculate current adjusted weight data with respect to the calculated current gradient, and transmit the calculated current adjusted weight data to a parent GPU of the corresponding current parent GPU via the current binary tree architecture, wherein the parent GPU is within the current set of GPUs.

6. A computer program product comprising a computer readable storage medium having program instructions embodied therewith, the program instructions executable by a processor to cause the processor to perform a method comprising:

identifying, by a host computer processor, graphic processor units (GPUs) that are available (available GPUs);

identifying, by the host computer processor, GPUs that are idle (initially idle GPUs) among the available GPUs for an initial iteration of deep learning;

choosing, by the host computer processor, one of the initially idle GPUs as an initial root solver GPU for the initial iteration;

initializing, by the host computer processor, weight data for an initial set of multidimensional data;

transmitting, by the host computer processor, the initial set of multidimensional data to the available GPUs;

forming, by the host computer processor, an initial set of GPUs into an initial binary tree architecture, wherein the initial set comprises the initially idle GPUs and the initial root solver GPU, wherein the initial root solver GPU is the root of the initial binary tree architecture;

calculating, by the initial set of GPUs, initial gradients and a set of initial adjusted weight data with respect to the weight data and the initial set of multidimensional data via the initial binary tree architecture;

in response to the calculating the initial gradients and the initial adjusted weight data, identifying, by the host computer processor, a first GPU among the available GPUs to become idle (first currently idle GPU) for a current iteration of deep learning;

choosing, by the host computer processor, the first currently idle GPU as a current root solver GPU for the current iteration;

transmitting, by the host computer processor, a current set of multidimensional data to the current root solver GPU;

in response to the identifying the first currently idle GPU, identifying, by the host computer processor, additional GPUs that are currently idle (additional currently idle GPUs) among the available GPUs;

transmitting, by the host computer processor, the current set of multidimensional data to the additional currently idle GPUs;

forming, by the host computer processor, a current set of GPUs into a current binary tree architecture, wherein the current set comprises the additional currently idle GPUs and the current root solver GPU, wherein the current root solver GPU is the root of the current binary tree architecture;

calculating, by the current set of GPUs, current gradients and a set of current adjusted weight data with respect to at least the weight data and the current set of multidimensional data via the current binary tree architecture;

in response to the initial root solver GPU receiving a set of calculated initial adjusted weight data, transmitting, by the initial root solver GPU, an initial update to the weight data to the available GPUs;

in response to the current root solver GPU receiving a set of current initial adjusted weight data, transmitting, by the current root solver GPU, a current update to the weight data to the available GPUs; and repeating the identifying, the choosing, the transmitting, the forming, and the calculating with respect to the weight data, updates to the weight data, and subsequent sets of multidimensional data.

7. The computer program product of claim 6, wherein the calculating the initial gradients and the set of initial adjusted weight data with respect to the weight data and the initial set of multidimensional data via the initial binary tree architecture comprises:

distributing, by the initial root solver GPU, the weight data to the initially idle GPUs within the initial set of GPUs via the initial binary tree architecture;

calculating, by each of the initially idle GPUs within the initial set of GPUs, an initial gradient with respect to the initial set of multidimensional data and the weight data;

transmitting, by each of the initially idle GPUs within the initial set of GPUs, the calculated initial gradient to a corresponding initial parent GPU within the initial set of GPUs via the initial binary tree architecture;

calculating, by the corresponding initial parent GPU, initial adjusted weight data with respect to the calculated initial gradient; and transmitting, by the corresponding initial parent GPU, the calculated initial adjusted weight data to a parent GPU of the corresponding initial parent GPU via the initial binary tree architecture, wherein the parent GPU is within the initial set of GPUs.

8. The computer program product of claim 6, wherein the calculating the current gradients and the set of current adjusted weight data with respect to at least the weight data and the current set of multidimensional data via the current binary tree architecture comprises:

distributing, by the current root solver GPU, the weight data to the additional currently idle GPUs within the current set of GPUs via the current binary tree architecture;

calculating, by each of the additional currently idle GPUs within the current set of GPUs, a current gradient with respect to the current set of multidimensional data and the weight data;

transmitting, by each of the additional currently idle GPUs within the current set of GPUs, the calculated current gradient to a corresponding current parent GPU within the initial set of GPUs via the current binary tree architecture;

calculating, by the corresponding current parent GPU, current adjusted weight data with respect to the calculated current gradient; and transmitting, by the corresponding current parent GPU, the calculated current adjusted weight data to a parent GPU of the corresponding current parent GPU via the current binary tree architecture, wherein the parent GPU is within the current set of GPUs.

* * * * *